United States Patent
Fukao et al.

(10) Patent No.: US 8,623,581 B2
(45) Date of Patent: *Jan. 7, 2014

(54) ELECTROSTATIC IMAGE DEVELOPING TONER, DEVELOPER, AND IMAGE FORMING APPARATUS

(75) Inventors: Tomohiro Fukao, Osaka (JP); Takuya Kadota, Hyogo (JP); Yoshihiro Mikuriya, Hyogo (JP); Tsuyoshi Nozaki, Osaka (JP); Yoshimichi Ishikawa, Hyogo (JP); Kazuoki Fuwa, Hyogo (JP); Tomoharu Miki, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 13/422,801

(22) Filed: Mar. 16, 2012

(65) Prior Publication Data

US 2012/0237267 A1    Sep. 20, 2012

(30) Foreign Application Priority Data

Mar. 17, 2011   (JP) ................................. 2011-058740

(51) Int. Cl.
*G03G 9/08*    (2006.01)

(52) U.S. Cl.
USPC ...................... 430/110.3; 430/108.1; 399/252

(58) Field of Classification Search
USPC .............................. 430/110.3, 108.1; 399/252
See application file for complete search history.

(56) References Cited

U.S. PATENT DOCUMENTS

| | | | |
|---|---|---|---|
| 7,556,904 B2 | 7/2009 | Kadota et al. |
| 7,556,906 B2 | 7/2009 | Katoh et al. |
| 7,587,159 B2 | 9/2009 | Fuwa et al. |
| 7,678,522 B2 | 3/2010 | Nakamura et al. |
| 7,720,428 B2 | 5/2010 | Hagi et al. |
| 7,727,694 B2 | 6/2010 | Murakami et al. |
| 7,749,671 B2 | 7/2010 | Yamamoto et al. |
| 7,817,946 B2 | 10/2010 | Murakami et al. |
| 7,820,348 B2 | 10/2010 | Hagi et al. |
| 7,829,254 B2 | 11/2010 | Kurose et al. |
| 7,838,193 B2 | 11/2010 | Hagi et al. |
| 7,873,300 B2 | 1/2011 | Fuwa et al. |
| 7,903,998 B2 | 3/2011 | Matsumoto et al. |
| 7,981,593 B2 | 7/2011 | Katoh et al. |
| 8,041,270 B2 | 10/2011 | Yasunaga et al. |

(Continued)

FOREIGN PATENT DOCUMENTS

| | | |
|---|---|---|
| JP | 62-17751 | 1/1987 |
| JP | 5-61245 | 3/1993 |

(Continued)

*Primary Examiner* — Mark A Chapman
(74) *Attorney, Agent, or Firm* — Oblon, Spivak, McClelland, Maier & Neustadt, L.L.P.

(57) ABSTRACT

An electrostatic image developing toner including: toner particles each containing binder resin and colorant; and an external additive supported on the toner particles, wherein the toner particles each have protrusions on surface thereof, average of lengths of long sides of the protrusions is 0.10 μm or more but less than 0.50 μm, standard deviation of the lengths of the long sides of the protrusions is 0.20 or less, coverage rate of the protrusions on the surface of each toner particle is 30% to 90%, the external additive includes at least two different particles including external additive (A) and one or more external additives (B), external additive (A) has longest average primary particle diameter among the external additives and charged to have the opposite polarity to the toner particles, and at least one of the external additives (B) is charged to have the same polarity as the toner particles.

20 Claims, 5 Drawing Sheets

(56) References Cited

U.S. PATENT DOCUMENTS

| | | |
|---|---|---|
| 8,043,779 B2 | 10/2011 | Yasunaga et al. |
| 8,053,154 B2 | 11/2011 | Kadota et al. |
| 8,110,330 B2 | 2/2012 | Ishikawa et al. |
| 2007/0217842 A1 | 9/2007 | Kato et al. |
| 2007/0238042 A1 | 10/2007 | Yasunaga et al. |
| 2008/0069617 A1 | 3/2008 | Matsumoto et al. |
| 2008/0070149 A1 | 3/2008 | Kato et al. |
| 2008/0076054 A1 | 3/2008 | Nozaki et al. |
| 2008/0096119 A1 | 4/2008 | Yamamoto et al. |
| 2008/0227001 A1 | 9/2008 | Kadota et al. |
| 2008/0227016 A1 | 9/2008 | Nozaki et al. |
| 2008/0233497 A1 | 9/2008 | Yamamoto et al. |
| 2008/0233511 A1 | 9/2008 | Ishikawa et al. |
| 2008/0279591 A1 | 11/2008 | Yasunaga et al. |
| 2009/0052952 A1 | 2/2009 | Katoh et al. |
| 2009/0117481 A1 | 5/2009 | Yasunaga et al. |
| 2009/0162772 A1 | 6/2009 | Fuwa et al. |
| 2010/0009282 A1 | 1/2010 | Katoh et al. |
| 2010/0055603 A1 | 3/2010 | Nozaki et al. |
| 2011/0053077 A1 | 3/2011 | Mikuriya et al. |
| 2011/0164901 A1 | 7/2011 | Yamamoto et al. |
| 2011/0250533 A1 | 10/2011 | Kadota et al. |
| 2011/0287356 A1 | 11/2011 | Fukao et al. |

FOREIGN PATENT DOCUMENTS

| | | |
|---|---|---|
| JP | 9-114129 | 5/1997 |
| JP | 9-258480 | 10/1997 |
| JP | 2750853 | 2/1998 |
| JP | 2838410 | 10/1998 |
| JP | 2876898 | 1/1999 |
| JP | 2895837 | 3/1999 |
| JP | 2003-202701 | 7/2003 |
| JP | 3495894 | 11/2003 |
| JP | 2004-341537 | 12/2004 |
| JP | 2006-208493 | 8/2006 |
| JP | 2006-259705 | 9/2006 |
| JP | 4076681 | 2/2008 |
| JP | 2008-90256 | 4/2008 |
| JP | 2008-145969 | 6/2008 |
| JP | 2008-233430 | 10/2008 |
| JP | 2008-241927 | 10/2008 |
| JP | 4298966 | 4/2009 |
| JP | 2009-210977 | 9/2009 |
| JP | 4648212 | 12/2010 |
| JP | 4852455 | 10/2011 |

ELECTROSTATIC IMAGE DEVELOPING TONER, DEVELOPER, AND IMAGE FORMING APPARATUS

BACKGROUND OF THE INVENTION

1. Field of the Invention

The present invention relates to a electrostatic image developing toner for dry-process developing a latent electrostatic image formed in an electrophotographic method, an electrostatic recording method and an electrostatic printing method.

2. Description of the Related Art

Dry-process developing devices using a powdery developing agent have widely been employed in image forming apparatuses such as electronic copiers, printers and facsimiles, in which a latent electrostatic image formed on a latent image bearing member is visualized with a developer to obtain a recorded image.

In recent years, color image forming apparatuses using electrophotographic process have broadly been employed, and digitized images are easily available. Thus, it is required to make an image to be printed at higher definition. While studying higher resolution and gradation of an image, as an improvement of a toner which visualizes a latent image, it has been studied to further conglobate and minimize in particle size for forming the image at high definition. And, since in the toners produced by the pulverizing methods, their conglobation and minimization are limited, so-called polymerized toners produced by a suspension polymerization method, an emulsification polymerization method and a dispersion polymerization method capable of conglobtaining and minimizing in particle size have been being employed.

In order to improve fluidity and chargeability of toner, a method has been proposed in which toner particles are mixed with inorganic powder such as metal oxides. Such inorganic powder is called external additives.

Examples of the inorganic powder known include silicon dioxide (i.e., silica), titanium dioxide (i.e., titania), aluminum oxide, zinc oxide, magnesium oxide, cerium oxide, iron oxide, copper oxide and tin oxide.

In order to modify hydrophobicity and chargeability of a surface of the inorganic powder, various methods have been proposed. In particular, a method is suitably used in which silica or titanium oxide powder is reacted with organic silicon compounds such as dimethyldichlorosilane, hexamethylene-disilazane and silicone oils to substitute silanol groups on surfaces of fine silica particles with organic groups for imparting hydrophobicity thereto.

In the production method of polymerized toners, toner materials having relatively low resistance are localized in the vicinity of the surfaces of toner core particles. Thus, the formed polymerized toners have low chargeability to cause background smear. In addition, the polymerized toner has a small particle diameter and thus has increased adhesive force to members, thereby raising problems such as filming and a drop in transfer efficiency. Furthermore, the polymerized toner is highly spherical to cause cleaning failure.

In view of this, attempts have been made to modify the surfaces of toner core particles to solve the aforementioned problems. The method for surface modification is, for example, dry methods in which fine particles are made to adhere onto the toner surfaces by the action of mechanical impact, and wet methods in which a resin dispersing agent is added to a dispersion liquid containing toner particles dispersed in a solvent, wherein the resin of the resin dispersing agent is different from the resin forming the toner particles. Regarding the dry methods, Japanese Patent (JP-B) No. 2838410 or other literatures disclose a toner including base particles and fine particles embedded in the surfaces thereof, wherein the toner is produced by adding the fine particles to the base particles heated to a temperature near their softening point, followed by stirring and mixing. Also, JP-B No. 2750853 discloses a toner including fine resin particles and core particles which are covered with the fine resin particles by the action of mechanical impact. In these dry methods, the fine particles are ununiform and thus cannot be attached on the toner surfaces sufficiently. As a result, the fine particles are exfoliated to cause problems such as filming and adhesion.

Regarding the wet methods, Japanese Patent Application Laid-Open (JP-A) No. 2008-090256 or other literatures disclose a method in which the surfaces of toner core particles formed of first resin particles and a colorant are partially or totally covered with second resin particles. However, according to this method, the toner core particles are covered with the second resin particles so sparsely and ununiformly that background smear and storage stability cannot be sufficiently improved, although cleanability is improved. In addition, degradation of transferability occurs.

JP-A No. 2008-233430 or other literatures disclose a toner including toner core particles and convex portions with an average diameter of 100 nm to 500 nm which are provided on the surfaces of the toner core particles, wherein the toner core particles are covered with the convex portions at a coverage rate of 10% to 80%. However, according to the production method described in Examples, the protrusions of the toner are not uniform in size, and thus the toner cannot solve problems such as background smear. The binder resin forming the convex portions has high polarity to greatly change depending on the environment and thus, is insufficient in improvement of heat resistance storage stability.

JP-A No. 2003-202701 or other literatures disclose a method in which fine resin particles are added in advance to an aqueous phase for fusion to control the particle diameter. However, in this method, the fine resin particles are incorporated into toner core particles, and as a result, the toner core particles cannot be covered with the fine resin particles in such an amount that heat resistance storage stability is improved.

According to JP-A No. 09-258480, cores are totally covered with shell layers, leading to considerable degradation of fixing property.

Some attempts to solve these problems have been made by appropriately selecting external additives. JP-A Nos. 2008-241927 and 2006-259705, JP-B Nos. 2876898, 4076681 and 3495894 and JP-A No. 2006-208493 disclose a method using an external additive having a large particle diameter. JP-A No. 09-114129, JP-B No. 2895837, and JP-A Nos. 62-17751, 05-61245, 2004-341537 and 2009-210977 disclose a method using an external additive having an opposite polarity to that of toner core particles.

The large-particle-diameter external additive is known to have a spacer effect of preventing toner core particles from being in direct contact with members. However, the above problems often arise with change in toner over time. Such a spacer effect cannot be obtained over a long period of time. This is likely because external additives are released or embedded; especially, those having a larger particle diameter are easier to be released.

In order to suppress release of external additives by the action of electrostatic force, for example, there are used external additives each having an opposite polarity to that of toner core particles or two different external additives having different polarities. In order to retain external additives, it is important to increase the contact area between external additives and toner core particles. Simply using an external additive having an opposite polarity cannot provide long-term effects.

SUMMARY OF THE INVENTION

An object of the present invention is to provide a toner (or developer) which does not contaminate a charging device, a developing device, a photoconductor and an intermediate transfer member, which can form a high-quality image having a proper image density with much less background smear even after long-term repetitive printing, and which can stably form an image with high reproducibility on any recording medium without involving blur or spot due to scattering.

In order to solve the above problems for a long period of time, it is necessary not to change the shape of protrusions nor adhesion state of external additives. The present inventors conducted extensive studies and have found that the above problems relate closely to a combination of the surface conditions of toner core particles, average primary particle diameters of external additives, and charge polarity of external additives. The present invention has been accomplished on the basis of the finding.

Specifically, an electrostatic image developing toner of the present invention includes:

toner particles each including a binder resin and a colorant; and an external additive carried on the toner particles, wherein the toner particles each have protrusions on a surface thereof, wherein an average of lengths of long sides of the protrusions is 0.10 μm or more but less than 0.50 μm, a standard deviation of the lengths of the long sides of the protrusions is 0.20 or less, and a coverage rate of the protrusions on the surface of each toner particle is 30% to 90%, wherein the external additive includes at least two different fine particles comprising external additive (A) and one or more external additives (B), and wherein the external additive (A) has a longest average primary particle diameter among the external additives and is charged to have the opposite polarity to that of the toner particles, and at least one of the one or more external additives (B) is charged to have the same polarity as that of the toner particles.

The present invention can provide a toner (or developer) which does not contaminate a charging device, a developing device, a photoconductor and an intermediate transfer member, which can form a high-quality image having a proper image density with much less background smear even after long-term repetitive printing, and which can stably form an image with high reproducibility on any recording medium without involving blur or spot due to scattering.

Figure 1A:
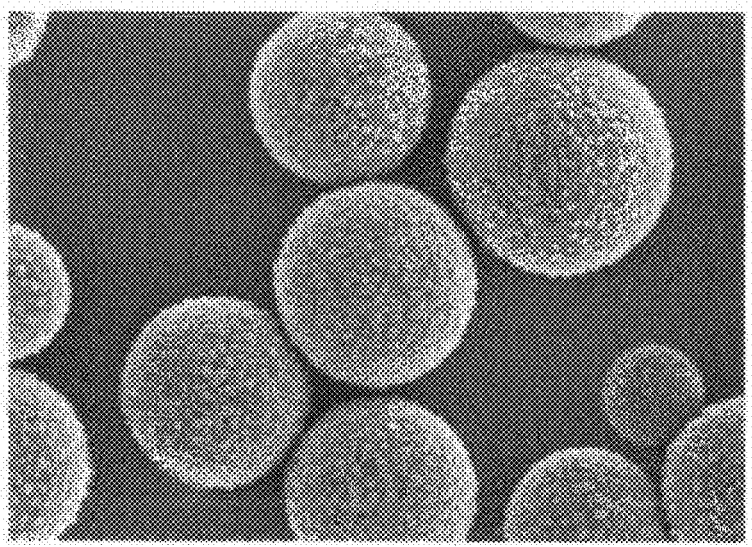
FIG. 1A is an SEM image of a toner of the present invention produced in Example 1.

DETAILED DESCRIPTION OF THE INVENTION (Electrostatic Image Developing Toner)

An electrostatic image developing toner of the present invention (may also be referred to as simply "toner") includes at least toner particles and an external additive, and, if necessary, further includes other components.

The toner particles each contain at least a binder resin and a colorant.

The external additive is carried on the toner particles.

The toner of the present invention may be obtained by adding the external additive to colored particles (hereinafter also referred to "toner particles," "toner base," or "colored resin particles") containing, as essential ingredients, a binder resin and a colorant and allowing the external additive to be supported on surfaces of the colored particles for improving properties such as flowability, developability and chargeability. Notably, the colored particles may, if necessary, further contain a releasing agent, a charge controlling agent and/or a plastisizer.

The toner particles each have protrusions on a surface thereof.

The average of lengths of long sides of the protrusions is 0.10 μm or more but less than 0.50 μm.

The standard deviation of the lengths of the long sides of the protrusions is 0.20 or less.

The coverage rate of the protrusions on a surface of each toner particle is 30% to 90%.

In the present invention, the toner particles refer to particles having protrusions on surfaces thereof.

The toner particles can be obtained by, for example, forming protrusions on surfaces of toner core particles.

The toner core particles refer to particles where protrusions have not formed yet on surfaces thereof.

The material of which the protrusions are formed is preferably a resin which is different from the binder resin, more preferably a resin containing styrene.

In order to suppress external additives from being released, it is effective to increase the contact area between external additives and toner particles. As in the present invention, when protrusions are provided on the surface of each toner core particle which have a uniform size much smaller than that of the toner core particle, it is possible to remarkably increase the surface area of the toner core particle. Thus, a certain amount of the external additive can be allowed to be supported on the polymerized toner particles while keeping their spherical shape, which is one advantage of the polymerized toner particles. Also, by using two or more different external additives where the external additive having the longest average primary particle diameter has the opposite polarity to that of the toner core particles, the adhesion between the external additives and the protrusions is strengthened without degrading chargeability of the toner, achieving a long-term spacer effect. In addition, the large-particle-diameter external additive reduces stress applied to the toner due to contact with members. Furthermore, the protrusions are suppressed over time from deformation and as a result it is possible to obtain a long-term surface modification effect derived from the protrusions. As described above, a remarkably advantageous effect can be attained by combining toner particles containing toner core particles and protrusions thereon with a large-particle-diameter external additive having an opposite polarity.

<Binder Resin>

The binder resin is not particularly limited and may be appropriately selected depending on the intended purpose. Examples thereof include polyester resins, polyurethane resins, polyurea resins, epoxy resins, and vinyl resins. Hybrid resins formed of chemically-bonded different resins may be used. Reactive functional groups may be introduced to the ends or side chains of resins, and bonded together to elongate in the process of preparing a toner to elongate. One type of the binder resin may be used, but preferably a resin of which the toner particles are formed is different from a resin of which the protrusions are formed, in order to produce a toner having protrusions which have a uniform size.

—Resin of which the Colored Particles are Made—

Resin of which the colored particles are made is a resin at least part of which is dissolved in organic solvents. An acid value of the resin is not particularly limited and may be appropriately selected depending on the intended purpose, but is preferably 2 mgKOH/g to 24 mgKOH/g. When the acid value exceeds 24 mgKOH/g, the resin is likely to transfer to the aqueous phase, resulting in loss of the resin through the production process or easily degrading the dispersion stability of oil droplets. Also, the toner may come to absorb a larger amount of water, leading to degradation of chargeability and storageability under high-temperature, high-humidity environment. Whereas when the acid value is lower than 2 mgKOH/g, the polarity of the resin may become low, making it difficult to uniformly disperse the colorant with some polarity in the oil droplets.

The type of the resin is not particularly limited, however, when the colored resin particles are used as a latent electrostatic image developing toner in electrophotography, the first resin is preferably a resin having a polyester skeleton from the viewpoint of obtaining good fixing property. The resin having a polyester skeleton includes polyester resins and block copolymers of polyesters and resins having other skeletons. Of these, polyester resins are preferably used since the obtained colored resin particles have high uniformity.

Examples of the polyester resin include ring-opening polymers of lactones, polycondensates of hydroxycarboxylic acid, and polycondensates of polyols and polycarboxylic acids. Of these, polycondensates of polyols and polycarboxylic acids are preferred since a wide variety of polyesters can be formed.

The peak molecular weight of the polyester resin is not particularly limited and may be appropriately selected depending on the intended purpose. It is generally 1,000 to 30,000, preferably 1,500 to 10,000, more preferably 2,000 to 8,000. When the peak molecular weight is lower than 1,000, the heat resistance storage stability of the toner is degraded. Whereas when the peak molecular weight exceeds 30,000, the low-temperature fixing property of the toner as latent electrostatic image developing toner is degraded.

Also, the glass transition temperature of the polyester resin is not particularly limited and may be appropriately selected depending on the intended purpose. It is generally 45° C. to 70° C., preferably 50° C. to 65° C. Presumably, the toner or toner cartridge is transported under high-temperature, high-humidity environment of 40° C. and 90%. Thus, when the glass transition temperature is lower than 45° C., the obtained colored resin particles are deformed under application of a certain pressure or stick to each other. As a result, there is a possibility that the toner particles cannot behave as particles. When the glass transition temperature is higher than 70° C., the formed toner is degraded in low-temperature fixing property when the colored resin particles are used as a latent electrostatic image developing toner. Needless to say, both cases are not preferred.

—Polyol—

Examples of polyols (1) include diols (1-1) and trihydric or higher polyols (1-2), with the diols (1-1) alone or a mixture containing the diols (1-1) and a small amount of the trihydric or higher polyols (1-2) being preferred.

Examples of diols (1-1) include alkylene glycols (e.g., ethylene glycol, 1,2-propylene glycol, 1,3-propylene glycol, 1,4-butanediol and 1,6-hexanediol); alkylene ether glycols (e.g., diethylene glycol, triethylene glycol, dipropylene glycol, polyethylene glycol, polypropylene glycol and polytetramethylene ether glycol); alicyclic diols (e.g., 1,4-cyclohexanedimethanol and hydrogenated bisphenol A); bisphenols (e.g., bisphenol A, bisphenol F and bisphenol S); adducts of the above-listed alicyclic diols with alkylene oxides (e.g., ethylene oxide, propylene oxide and butylene oxide); 4,4'-dihydroxybiphenyls such as 3,3'-difluoro-4,4'-dihydroxybiphenyl; bis(hydroxyphenyl)alkanes such as bis(3-fluoro-4-hydroxyphenyl)methane, 1-phenyl-1,1-bis(3-fluoro-4-hydroxyphenyl)ethane, 2,2-bis(3-fluoro-4-hydroxyphenyl)propane, 2,2-bis(3,5-difluoro-4-hydroxyphenyl)propane (also known as tetrafluorobisphenol A) and 2,2-bis(3-hydroxyphenyl)-1,1,1,3,3,3-hexafluoropropane; bis(4-hydroxyphenyl)ethers such as bis(3-fluoro-4-hydroxyphenyl)ether; and adducts of the above-listed bisphenols with alkylene oxides (e.g., ethylene oxide, propylene oxide and butylene oxide).

Of these, preferred are C2 to C12 alkylene glycols and alkylene oxide adducts of bisphenols. Particularly preferred are combinations of alkylene oxide adducts of bisphenols and C2 to C12 alkylene glycols.

Examples of the trihydric or higher polyols (1-2) include trihydric to octahydric or higher aliphatic polyalcohols (e.g., glycerin, trimethylolethane, trimethylolpropane, pentaerythritol and sorbitol); trihydric or higher phenols (e.g., trisphenol PA, phenol novolac and cresol novolac); and alkylene oxide adducts of the above trihydric or higher polyphenols.

—Polycarboxylic Acid—

Examples of polycarboxylic acids (2) include dicarboxylic acids (2-1) and trivalent or higher polycarboxylic acids (2-2), with the dicarboxylic acids (2-1) alone or a mixture containing the dicarboxylic acids (2-1) and a small amount of the trivalent or higher polycarboxylic acids (2-2) being preferred.

Examples of dicarboxylic acids (2-1) include alkylene dicarboxylic acids (e.g., succinic acid, adipic acid and sebacic acid); alkenylene dicarboxylic acids (e.g., maleic acid and fumaric acid); aromatic dicarboxylic acids (e.g., phthalic acid, isophthalic acid, terephthalic acid and naphthalene dicarboxylic acid), 3-fluoroisophthalic acid, 2-fluoroisophthalic acid, 2-fluoroterephthalic acid, 2,4,5,6-tetrafluoroisophthalic acid, 2,3,5,6-tetrafluoroterephthalic acid, 5-trifluoromethylisophthalic acid, 2,2-bis(4-carboxyphenyl)hexafluoropropane, 2,2-bis(3-carboxyphenyl)hexafluoropropane, 2,2'-bis(trifluoromethyl)-4,4'-biphenyldicarboxylic acid, 3,3'-bis(trifluoromethyl)-4,4'-biphenyldicarboxylic acid, 2,2'-bis(trifluoromethyl)-3,3'-biphenyldicarboxylic acid and hexafluoroisopropylidenediphthalic anhydride. Of these, preferred are C4 to C20 alkenylenedicarboxylic acids and C8 to C20 aromatic dicarboxylic acids.

Examples of trivalent or higher polycarboxylic acids (2-2) include C9 to C20 aromatic polycarboxylic acids (e.g., trimellitic acid and pyromellitic acid). Notably, polycarboxylic acids (2) reacted with polyols (1) may be acid anhydrides or lower alkyl esters (e.g., methyl ester, ethyl ester and isopropyl ester) of the above carboxylic acids.

The ratio between polyol and polycarboxylic acid is generally 2/1 to 1/2, preferably 1.5/1 to 1/1.5, more preferably 1.3/1 to 1/1.3, in terms of the equivalent ratio [OH]/[COOH] of the hydroxyl group [OH] to the carboxyl group [COOH].

—Modified Resin—

In order for the colored resin particles to have an increased mechanical strength and, when the colored resin particles are used as a latent electrostatic image developing toner, further involve no hot offset upon fixing, a modified resin containing an end isocyanate group (hereinafter may be referred to as "isocyanate group-containing prepolymer (A)") may be dissolved in the oil phase for producing the colored resin particles. The method for producing the modified resin includes a method in which an isocyanate group-containing monomer is used for polymerization reaction to obtain an isocyanate group-containing resin; and a method in which a resin having an active hydrogen-containing group at its end is obtained through polymerization and then reacted with polyisocyanate to obtain a polymer containing an isocyanate group at its end. The latter method is preferred from the viewpoint of satisfactorily introducing an isocyanate group into the end of the polymer. Examples of the active hydrogen-containing group include a hydroxyl group (i.e., an alcoholic hydroxyl group and a phenolic hydroxyl group), an amino group, a carboxyl group and a mercapto group, with an alcoholic hydroxyl group being preferred. Considering uniformity of particles, the skeleton of the modified resin is preferably the same as that of a resin dissolvable in the organic solvent. The resin preferably has a polyester skeleton. In one employable method for producing a polyester having an alcoholic hydroxyl group at its end, polycondensation reaction is performed between a polyol having more functional groups (i.e., hydroxyl groups) and a polycarboxylic acid having less functional groups (i.e., carboxyl groups).

—Amine Compound—

In the process of dispersing the oil phase in the aqueous phase to form particles, some isocyanate groups of the modified resin are hydrolyzed into amino groups, which are then reacted with unreacted isocyanate groups to allow elongation reaction to proceed. Also, an amine compound may be used in combination to perform elongation reaction and introduce crosslinked points as well as the above reaction. The amine compound (B) includes diamines (B1), trivalent or higher polyamines (B2), aminoalcohols (B3), aminomercaptans (B4), amino acids (B5) and amino-blocked compounds (B6) obtained by blocking the amino group of B1 to B5.

The diamine (B1) includes aromatic diamines (e.g., phenylene diamine, diethyltoluene diamine, 4,4'-diaminodiphenylmethane, tetrafluoro-p-xylylenediamine and tetrafluoro-p-phenylenediamine); alicyclic diamines (e.g., 4,4'-diamino-3,3'-dimethyldicyclohexylmethane, diaminecyclohexane and isophorondiamine); and aliphatic diamines (e.g., ethylenediamine, tetramethylenediamine, hexamethylenediamine, dodecafluorohexylenediamine and tetracosafluorododecylenediamine).

The trivalent or higher polyamine (B2) includes diethylenetriamine and triethylenetetramine.

The aminoalcohol (B3) includes ethanolamine and hydroxyethylaniline.

The aminomercaptan (B4) includes aminoethylmercaptan and aminopropylmercaptan. The amino acid (B5) includes aminopropionic acid and aminocaproic acid.

The amino-blocked compound (B6) obtained by blocking the amino group of B1 to B5 includes oxazolidine compounds and ketimine compounds derived from the amines B1 to B5 and ketones (e.g., acetone, methyl ethyl ketone and methyl isobutyl ketone). Among these amines (B), preferred are B1 and a mixture containing B1 and a small amount of B2.

Regarding the amount of the amine (B) relative to the amount of the isocyanate group-containing prepolymer (A), the number of amino groups [NHx] in the amine (B) is four or less times, preferably twice or less times, more preferably 1.5 or less times, further preferably 1.2 or less times, the number of isocyanate groups [NCO] in the isocyanate group-containing prepolymer (A). When the number of amino groups [NHx] in the amine (B) is preferably more than four times the number of isocyanate groups [NCO] in the isocyanate group-containing prepolymer (A), excessive amino groups disadvantageously block isocyanate groups to prevent the elongation reaction of the modified resin. As a result, the polyester is decreased in molecular weight, resulting in degradation of hot offset resistance of the toner.

<Organic Solvent>

The organic solvent used in production of the colored particles is preferably a volatile organic solvent having a boiling point lower than 100° C. from the viewpoint of easily removing the solvent. The organic solvent includes toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone and methyl isobutyl ketone. These may be used alone or in combination. When the resin to be dissolved or dispersed in the organic solvent has a polyester skeleton, preferably used are ester solvents (e.g., methyl acetate, ethyl acetate and butyl acetate) or ketone solvents (e.g., methyl ethyl ketone and methyl isobutyl ketone) since these solvents have high dissolution capability to the resin. Among them, methyl acetate, ethyl acetate and methyl ethyl ketone are particularly preferred since these can be removed more easily.

<Aqueous Medium>

The aqueous medium used in production of the colored particles may be water alone or a mixture of water and a water-miscible solvent. The water-miscible solvent includes alcohols (e.g., methanol, isopropanol and ethylene glycol), dimethylformamide, tetrahydrofuran, cellosolves (e.g., methyl cellosolve (registered trademark)) and lower ketones (e.g., acetone and methyl ethyl ketone).

<Surfactant>

In one exemplary method for producing colored particles, a surfactant is used for dispersing the oil phase in the aqueous medium to form liquid droplets.

The surfactant includes anionic surfactants such as alkylbenzenesulfonic acid salts, α-olefin sulfonic acid salts and phosphoric acid esters; cationic surfactants such as amine salts (e.g., alkyl amine salts, aminoalcohol fatty acid derivatives, polyamine fatty acid derivatives and imidazoline), and quaternary ammonium salts (e.g., alkyltrimethylammonium salts, dialkyl dimethylammonium salts, alkyl dimethyl benzyl ammonium salts, pyridinium salts, alkyl isoquinolinium salts and benzethonium chloride); nonionic surfactants such as fatty acid amide derivatives and polyhydric alcohol derivatives; and amphoteric surfactants such as alanine, dodecyldi (aminoethyl)glycine, di(octylaminoethyl)glycine and N-alkyl-N,N-dimethylammonium betaine. Also, a fluoroalkyl group-containing surfactant can exhibit its dispersing effects even in a very small amount.

A fluoroalkyl group-containing anionic surfactant suitably used includes fluoroalkyl carboxylic acids having 2 to 10 carbon atoms and metal salts thereof, disodium perfluorooctanesulfonylglutamate, sodium 3-[ω-fluoroalkyl (C6 to C11) oxy)-1-alkyl(C3 or C4) sulfonates, sodium 3-[ω-fluoroalkanoyl(C6 to C8)-N-ethylamino]-1-propanesulfonates, fluoroalkyl(C11 to C20) carboxylic acids and metal salts thereof, perfluoroalkylcarboxylic acids(C7 to C13) and metal salts thereof, perfluoroalkyl(C4 to C12)sulfonates and metal salts thereof, perfluorooctanesulfonic acid diethanol amide, N-propyl-N-(2-hydroxyethyl)perfluorooctanesulfone amide, perfluoroalkyl(C6 to C10)sulfonamide propyltrimethylammonium salts, salts of perfluoroalkyl(C6 to C10)-N-ethylsulfonylglycin and monoperfluoroalkyl(C6 to C16) ethylphosphates. The cationic surfactant includes aliphatic primary, secondary or tertiary amine acid containing a fluoroalkyl group, aliphatic quaternary ammonium salts (e.g., perfluoroalkyl(C6 to C10) sulfonamide propyltrimethylammonium salts), benzalkonium salts, benzethonium chloride, pyridinium salts and imidazolinium salts.

<Inorganic Dispersing Agent>

In one exemplary method for producing colored particles, the dissolution or dispersion product of the toner composition may be dispersed in the aqueous medium in the presence of an inorganic dispersing agent or fine resin particles.

The inorganic dispersing agent includes tricalcium phosphate, calcium carbonate, titanium oxide, colloidal silica and hydroxyapatite. Use of the dispersing agent is preferred since a sharp particle size distribution and a stable dispersion state can be attained.

<Protective Colloid>

In one exemplary method for producing colored particles, a polymeric protective colloid may be used to stabilize dispersed liquid droplets.

For example, acids (e.g., acrylic acid, methacrylic acid, α-cyanoacrylic acid, α-cyanomethacrylic acid, itaconic acid, crotonic acid, fumaric acid, maleic acid and maleic anhydride); hydroxyl group-containing (meth)acrylic monomers (e.g., β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylic acid esters, diethylene glycol monomethacrylic acid esters, glycerin monoacrylic acid esters, glycerin monomethacrylic acid esters, N-methylolacrylamide and N-methylolmethacrylamide), vinyl alcohol and ethers thereof (e.g., vinyl methyl ether, vinyl ethyl ether and vinyl propyl ether), esters formed between vinyl alcohol and a carboxyl group-containing compound (e.g., vinyl acetate, vinyl propionate and vinyl butyrate), acrylamide, methacrylamide, diacetone acrylamide and methylol compounds thereof; acid chlorides (e.g., acrylic acid chloride and methacrylic acid chloride); homopolymers or copolymers of nitrogen-containing compounds and nitrogen-containing heterocyclic compounds (e.g., vinyl pyridine, vinyl pyrrolidone, vinyl imidazole and ethyleneimine); polyoxyethylenes (e.g., polyoxyethylene, polyoxypropylene, polyoxyethylene alkyl amines, polyoxypropylene alkyl amines, polyoxyethylene alkyl amides, polyoxypropylene alkyl amides, polyoxyethylene nonylphenyl ethers, polyoxyethylene laurylphenyl ethers, polyoxyethylene stearylphenyl esters and polyoxyethylene nonylphenyl esters); and celluloses (e.g., methyl cellulose, hydroxyethyl cellulose and hydroxypropyl cellulose) can be used.

When an acid- or alkali-soluble compound (e.g., calcium phosphate) is used as a dispersion stabilizer, the calcium phosphate used is dissolved with an acid (e.g., hydrochloric acid), followed by washing with water, to thereby remove it from the formed fine particles (toner particles). Also, the calcium phosphate may be removed through enzymatic decomposition. Alternatively, the dispersing agent used may remain on the surfaces of the toner particles. But, the dispersing agent is preferably removed through washing after elongation and/or crosslinking reaction in terms of chargeability of the formed toner.

<Colorant>

Known dyes and pigments can be used as the colorant. Examples thereof include carbon black, nigrosine dye, iron black, naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazinelake, quinoline yellow lake, anthrasan yellow BGL, isoindolinon yellow, colcothar, red lead, lead vermilion, cadmium red, cadmium mercury red, antimony vermilion, permanent red 4R, parared, fiser red, parachloroorthonitro anilin red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red FSR, brilliant carmin 6B, pigment scarlet 3B, bordeaux 5B, toluidine Maroon, permanent bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanin blue, phthalocyanin blue, fast sky blue, indanthrene blue (RS and BC), indigo, ultramarine, iron blue, anthraquinon blue, fast violet B, methylviolet lake, cobalt purple, manganese violet, dioxane violet, anthraquinon violet, chrome green, zinc green, chromium oxide, viridian, emerald green, pigment green B, naphthol green B, green gold, acid green lake, malachite green lake, phthalocyanine green, anthraquinon green, titanium oxide, zinc flower, lithopone and mixtures thereof.

—Colorant Formed into Masterbatch—

The colorant may be mixed with a resin to form a masterbatch.

Examples of the binder resin which is used for producing a masterbatch or which is kneaded together with a masterbatch include the above-described modified or unmodified polyester resins; styrene polymers and substituted products thereof (e.g., polystyrenes, poly-p-chlorostyrenes and polyvinyltoluenes); styrene copolymers (e.g., styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloro methacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers); polymethyl methacrylates; polybutyl methacrylates; polyvinyl chlorides; polyvinyl acetates; polyethylenes; polypropylenes, polyesters; epoxy resins; epoxy polyol resins; polyurethanes; polyamides; polyvinyl butyrals; polyacrylic acid resins; rosin; modified rosin; terpene resins; aliphatic or alicyclic hydrocarbon resins; aromatic petroleum resins; chlorinated paraffins; and paraffin waxes. These may be used alone or in combination.

—Preparation Method of Masterbatch—

The masterbatch can be prepared by mixing/kneading a colorant with a resin for use in a masterbatch through application of high shearing force. Also, an organic solvent may be used for improving mixing between these materials. Further, the flashing method, in which an aqueous paste containing a colorant is mixed/kneaded with a resin and an organic solvent and then the colorant is transferred to the resin to remove water and the organic solvent, is preferably used, since a wet cake of the colorant can be directly used (i.e., no drying is required to be performed). In this mixing/kneading, a high-shearing disperser (e.g., three-roll mill) is preferably used.

<External Additives>

In the present invention, two or more types of fine particles are used as external additives. Among the external additives, an external additive having the longest average primary particle diameter is referred to as an external additive (A), and one or more external additives other than the external additive (A) are referred to as a external additive(s) (B). External additives having large particle diameter act as spacers to suppress contact between the toner and members. External additives having small particle diameter impart fluidity to the toner. The larger the particle diameter of the external additives, the easier it is to exfoliate from the toner particles. However, when the external additive (A) has the opposite polarity to that of the toner particles, adhesion strength between the external additives and the toner particles is enhanced by the action of electrostatic force, and thus the external additives cannot be easily exfoliated from the toner particles. Meanwhile, at least one of the external additives (B) other than the external additive (A) has the same polarity as that of the toner particles.

The fine particles used as the external additives may be inorganic or organic.

—Fine Inorganic Particles—

The fine inorganic particles includes silica, alumina, titanium oxide, barium titanate, magnesium titanate, calcium titanate, strontium titanate, iron oxide, copper oxide, zinc oxide, tin oxide, silica sand, clay, mica, wollastonite, diatom earth, chromium oxide, cerium oxide, red oxide, antimony trioxide, magnesium oxide, zirconium oxide, barium sulfate, barium carbonate, silicon carbide, silicon nitride.

Among these, silica and titanium oxide are preferable.

—Fine Organic Particles—

The fine organic particles include styrene polymers and substituted styrene polymers such as polystyrene, poly-p-chlorostyrene, polyvinyltoluene; styrene copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl-α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, styrene-maleic acid ester copolymers; and other resins such as polymethyl methacrylate, polybutyl methacrylate, polyvinyl chloride, polyvinyl acetate, polyethylene, polypropylene, polyesters, epoxy resins, epoxy polyol resins, polyurethanes, polyamides, polyvinyl butyrals, polyacrylic resins, rosins, modified rosins, terpene resins, aliphatic or alicyclic hydrocarbon resins, aromatic petroleum resins, chlorinated paraffin, paraffin waxes. These may be used alone or in combination.

—Hydrophobization Treatment—

The surface of external additives used in the present invention is preferably hydrophobized. For example, a method for hydrophobizing the fine inorganic particles includes a method in which the fine inorganic particles are chemically treated with organic silicon compounds which can react with the fine inorganic particles or to which the fine inorganic particles can be physically adsorbed.

A method is preferably used in which the fine inorganic particles are oxidized by a halogenated metal in a vapor phase and then treated with organic silicon compounds.

Examples of the organic silicon compounds used in the hydrophobization treatment include hexamethylene disilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, ρ-chloroethyltrichlorosilane, chloromethyldimethylchlorosilane, triorganosilylmercaptane, trimethylsilylmercaptane, triorganosilyl acrylate, vinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane, dimethylpolysiloxane having 2 to 12 siloxane units per one molecule and, at each ends, one hydroxy group connecting with silicon atom.

Untreated fine inorganic particles can be hydrophobized using nitrogen-containing silane coupling agents. Specifically in the case where the toner particles have a negative polarity, preferable are the fine inorganic particles which have been treated with the nitrogen-containing silane coupling agents as external additives charged to the opposite polarity to that of the toner particles. Examples of the nitrogen-containing silane coupling agents include aminopropyltrimethoxysilane, aminopropyltriethoxysilane, dimethylaminopropyltrimethoxysilane, diethylaminopropyltrimethoxysilane, dipropylaminopropyltrimethoxysilane, dibutylaminopropyltrimethoxysilane, monobutylaminopropyltrimethoxysilane, dioctylaminopropyltrimethoxysilane, dibutylaminopropyldimethoxysilane, dibutylaminopropylmonomethoxysilane, dimethylaminophenyltriethoxysilane, trimethoxysilyl-γ-propylphenylamine, trimethoxysilyl-γ-propylbenzylamine, trimethoxysilyl-γ-propylpiperidine, trimethoxysilyl-γ-propylmorphorine, and trimethoxysilyl-γ-propylimidazole.

These may be used alone or in combination.

Fine inorganic particles with or without hydrophobization treatment can be treated with a silicone oil to use as the external additives.

Examples of the silicone oil include dimethylsilicone oil, methylphenylsilicone oil, chlorophenylsilicone oil, methylhydrogensilicone oil, alkyl-modified silicone oil, fluorine-modified silicone oil, polyether-modified silicone oil, alcohol-modified silicone oil, amino-modified silicone oil, epoxy-modified silicone oil, epoxy/polyether-modified silicone oil, phenol-modified silicone oil, carboxyl-modified silicone oil, mercapto-modified silicone oil, acrylic-modified silicone oil, methacrylic-modified silicone oil, and α-methylstyrene-modified silicone oil.

These may be used alone or in combination.

A method for treating the fine inorganic particles with the silicone oil includes a method in which the fine inorganic particles are dried in an oven which has been heated at several hundred degrees Celsius to fully remove water therefrom; and are uniformly contacted with the silicone oil so that the silicone oil is made to attach onto a surface of the fine inorganic particles.

A method for attaching the silicone oil onto the surface of the fine inorganic particles includes the following methods: (1) sufficiently mixing the fine inorganic particles with the silicone oil using a mixer such as a rotating blade while keeping the fine inorganic particles in powder form; or (2) dissolving the silicone oil in a solvent having relatively low boiling point and capable of being diluted with the silicone oil, immersing the fine inorganic particles into the resultant solution, and then drying the solvent to remove it therefrom.

When the silicone oil has a high viscosity, it is preferable to use the latter method.

The fine inorganic particles onto which the silicone oil has been attached are then heated in an oven which has been heated to a temperature from 100° C. to several hundred degrees Celsius (generally about 400° C.). Through this heat treatment, siloxane bonds can be formed between a metal and the silicone oil via hydroxyl groups on the surface of the fine inorganic particles, and/or the silicone oil itself can be further polymerized and crosslinked.

A catalyst such as acids, alkalis, and metal salts such as zinc octylate, tin octylate and dibutyl tin dilaurate may have been previously added to the silicone oil to accelerate the reaction.

The fine inorganic particles may have been previously treated with hydrophobizating agents such as silane coupling agents before the silicone oil treatment.

The fine inorganic particles which have been subjected to the hydrophobization treatment adsorb more silicone oil than the fine inorganic particles which have not been subjected to the hydrophobization treatment.

—Particle Diameter of Fine Particles as External Additives—

The average primary particle diameter of primary particles of fine particles used as external additives is not particularly limited and may be appropriately selected depending on the intended purpose. The external additive (A) having the longest average primary particle diameter among at least two different external additives generally has an average primary particle diameter of 50 nm to 500 nm, preferably 80 nm to 300 nm, more preferably 100 nm to 200 nm. When the average primary particle diameter is smaller than 50 nm, it is easy for the external additive to be embedded in the toner particles, potentially resulting in failure to obtain a long-term spacer effect. When the average primary particle diameter is larger than 500 nm, it is considerably easy for the external additive to be exfoliated from the toner core particles, potentially resulting in failure to obtain a long-term spacer effect. In addition, such too large external additive does ununiformly damage to the photoconductor surface, which is not preferred. The average primary particle diameter of the other external additives (external additive (B)) is generally 10 mm to 50 nm, preferably 10 nm to 40 nm. Two or more types of external additives (B) may be used provided that their average primary particle diameters fall within the above range. When the average primary particle diameter is smaller than 10 nm, the external additive is considerably embedded in the toner particles, potentially resulting in failure to obtain desired fluidity, which is not preferred. When the average primary particle diameter is larger than 50 nm, desired fluidity cannot be obtained similarly, which is not preferred. Here, the average particle diameter is a number average particle diameter.

The particle diameter of the fine particles used as external additives in the present invention can be measured by a particle size distribution analyzer, which measures a particle diameter utilizing dynamic light scattering. Examples thereof include DLS-700 (product of Otsuka Electronics Co., Ltd.) and Coulter N4 (product of Coulter Electronics, Inc.). However, since it is difficult to dissociate the secondary aggregated fine particles after the silicone oil treatment, preferable is directly determining the particle diameter using a photomicrograph taken with a scanning electron microscope or a transmission electron microscope. More preferable is observing the external additives on the surface of the toner particles using a FE-SEM (field emission type scanning electron microscope) at a magnification of 100,000.

In this case, it is preferable that at least 100 fine particles are observed to calculate an average length of major axes thereof. When the external additives are aggregated on the surfaces of the toner particles, the length of the major axis of each primary particle constituting an aggregation is measured.

—Method for External Adding—

The external additives are added to the toner and mixed therewith using conventional mixers for mixing powders. Examples of the mixers include a mixer having a jacket to control the inside temperature thereof. In order to change a loading applied to the external additives, a rotation number and rolling speed of the mixers, and mixing time and temperature may be changed. For example, at first a high loading may be applied and then a relatively low loading may be applied, and vice versa. Examples of the usable mixers include a locking mixer, LOEDIGE MIXER, NAUTOR MIXER, and HENSHEL MIXER.

—Amount of External Additives—

Toner properties can be controlled depending on an amount of the external additives.

The amount of the external additive (A) is not particularly limited and may be appropriately selected depending on the intended purpose, but generally 0.1% by mass to 2.0% by mass, preferable 0.2% by mass to 1.5% by mass, more preferable 0.3% by mass to 1.0% by mass relative to the toner particles. When the amount is less than 0.1% by mass, advantageous effects of the present invention cannot be exerted in some cases. When the amount exceeds 2.0% by mass, the toner may be considerably deteriorated in fluidity, chargeability, and fixing property. Needless to say, both cases are not preferred.

The amount of the external additives (B) are not particularly limited and may be appropriately selected depending on the intended purpose, but generally 0.1% by mass to 5.0% by mass, preferable 1.0% by mass to 4.0% by mass, more preferable 1.5% by mass to 3.0% by mass relative to the toner particles. When the amount is less than 0.1% by mass, the toner may be considerably deteriorated in fluidity and storageability. When the amount exceeds 5.0% by mass, the toner properties may considerably change over time. In addition, members may be contaminated with exfoliated external additives due to low adhesion strength with the toner particles. Needless to say, both cases are not preferred. When two or more types of the external additives (B) are used, the total amount of the external additives (B) should be in the foregoing range.

<Releasing Agent>

In order for the toner to have an increased releasing property during fixing when the colored resin particles are used as a latent electrostatic image developing toner, a releasing agent may be dispersed in the organic solvent in advance.

The releasing agent may be, for example, wax and silicone oil that exhibit a sufficiently low viscosity when heated during the fixing process and that are difficult to be compatible or swelled with other colored resin particles materials on the fixing member surface. Considering the storage stability of the colored resin particles themselves, preferably used is wax that generally exists as a solid in the colored resin particles during storage.

The wax includes long-chain hydrocarbons and carbonyl group-containing waxes.

Examples of the long-chain hydrocarbon include polyolefin waxes (e.g., polyethylene wax and polypropylene wax); petroleum waxes (e.g., paraffin waxes, SASOL wax and microcrystalline waxes); and Fischer-Tropsch waxes.

Examples of the carbonyl group-containing wax include polyalkanoic acid esters (e.g., carnauba wax, montan wax, trimethylolpropane tribehenate, pentaerythritol tetrabehenate, pentaerythritol diacetatedibehenate, glycerine tribehenate and 1,18-octadecanediol distearate); polyalkanol esters (e.g., tristearyl trimellitate and distearyl malleate); polyalkanoic acid amides (e.g., ethylenediamine dibehenylamide); polyalkylamides (e.g., trimellitic acid tristearylamide); and dialkyl ketones (e.g., distearyl ketone).

Of these, long-chain hydrocarbons are preferred since they exhibit better releasing property. Furthermore, the long-chain hydrocarbons may be used in combination with the carbonyl group-containing waxes. The amount of the releasing agent contained in the toner is not particularly limited and may be appropriately selected depending on the intended purpose. It is generally 2% by mass to 25% by mass, preferably 3% by mass to 20% by mass, more preferably 4% by mass to 15% by mass. When it is less than 2% by mass, the releasing property of the formed toner cannot be obtained during fixing. Whereas when it is more than 25% by mass, the formed colored resin particles may be degraded in mechanical strength.

<Charge Controlling Agent>

If necessary, a charge controlling agent may be dissolved or dispersed in the organic solvent in advance.

The charge controlling agent may be any known charge controlling agent. Examples thereof include nigrosine dyes, triphenylmethane dyes, chrome-containing metal complex dyes, molybdic acid chelate pigments, rhodamine dyes, alkoxy amines, quaternary ammonium salts (including fluorine-modified quaternary ammonium salts), alkylamides, phosphorus, phosphorus compounds, tungsten, tungsten compounds, fluorine active agents, metal salts of salicylic acid, and metal salts of salicylic acid derivatives. Specific examples include nigrosine dye BONTRON 03, quaternary ammonium salt BONTRON P-51, metal-containing azo dye BONTRON S-34, oxynaphthoic acid-based metal complex E-82, salicylic acid-based metal complex E-84 and phenol condensate E-89 (these products are of ORIENT CHEMICAL INDUSTRIES CO., LTD), quaternary ammonium salt molybdenum complex TP-302 and TP-415 (these products are of Hodogaya Chemical Co., Ltd.), quaternary ammonium salt COPY CHARGE PSY VP 2038, triphenylmethane derivative COPY BLUE PR, quaternary ammonium salt COPY CHARGE NEG VP2036 and COPY CHARGE NX VP434 (these products are of Hoechst AG), LRA-901 and boron complex LR-147 (these products are of Japan Carlit Co., Ltd.), copper phthalocyanine, perylene, quinacridone, azo pigments, and polymeric compounds having, a functional group such as a sulfonic acid group, carboxyl group, or quaternary ammonium salt.

The amount of the charge controlling agent contained in the toner is not particularly limited and may be determined depending on the intended purpose, so long as the charge controlling agent can exhibit its performances without degrading the fixing property of the toner. The amount thereof is generally 0.5% by mass to 5% by mass, preferably 0.8% by mass to 3% by mass.

<Production Method of Toner>

The production method of toner is not particularly limited and may be appropriately selected depending on the intended purpose. Examples thereof include known wet process granulation methods such as a dissolution suspension method, a suspension polymerization method, and an emulsification aggregation method, and pulverizing methods. Among these, a dissolution suspension method and an emulsification aggregation method are preferable in terms of easiness for controlling the particle diameter and shape of the toner.

The toner particles are preferably obtained through a process including producing the toner core particles, and attaching or fusing protrusions on the surfaces of the toner core particles.

After the toner core particles have been produced by a known emulsification aggregation method or suspension polymerization method, fine resin particles are added to the reaction system, so that the fine resin particles are attached to and fused with the surfaces of the toner core particles. Here, the reaction system may be heated to promote attachment and fusion of the fine resin particles. Also, use of a metal salt is effective in promoting the attachment and fusion.

The toner particles having protrusions on the surfaces thereof can be obtained by attaching or fusing the fine resin particles on the surfaces of the toner core particles.

The toner particles are preferably obtained by forming protrusions on the surfaces of the toner core particles, and the toner core particles are obtained through granulation performed by emulsifying or dispersing, in an aqueous medium, an oil phase containing at least the colorant and the first resin as a binder resin and/or a precursor of the binder resin.

The toner particles are preferably obtained by adding an aqueous dispersion liquid of the fine resin particles to the aqueous medium containing the toner core particles emulsified or dispersed therein, to attach or fuse the fine resin particles to the surfaces of the core particles.

The first resin is not particularly limited and may be appropriately selected depending on the intended purpose. Examples thereof include the resins described in the binder resin section.

The precursor of the first resin is not particularly limited and may be appropriately selected depending on the intended purpose. Examples thereof include the modified resin containing the end isocyanate group.

—Fine Resin Particles—

The fine resin particles used in production of the protrusions can be the fine resin particles dispersed in the aqueous medium before use. The resin of the fine resin particles includes vinyl resins, polyesters, polyurethanes, polyureas and epoxy resins. Of these, vinyl resins are preferred from the viewpoint of easily obtaining the fine resin particles dispersed in the aqueous medium. Examples of the method for preparing aqueous dispersoids of vinyl fine resin particles include known polymerization methods such as an emulsification aggregation method, a suspension polymerization method and a dispersion polymerization method. Of these, an emulsification aggregation method is particularly preferred from the viewpoint of easily obtaining particles having a particle diameter suitable for the present invention.

—Vinyl Fine Resin Particles—

The vinyl fine resin particles contain a vinyl resin obtained through polymerization of a monomer mixture containing at least a styrene monomer.

In order for the toner particles to be used as charged functional particles like latent electrostatic image developing toner particles, the toner particles each preferably have an easily chargeable surface. Therefore, in the monomer mixture, the amount of the styrene monomer, which has electron orbitals where electrons can stably travel as can be seen in aromatic ring structures is 50% by mass to 100% by mass, preferably 80% by mass to 100% by mass, more preferably 95% by mass to 100% by mass. When the amount of the styrene monomer is less than 50% by mass, the obtained toner particles are poor in chargeability, which may impose limitation on applications of the colored resin particles.

Here, the styrene monomer refers to an aromatic compound having a vinyl polymerizable functional group. The vinyl polymerizable functional group includes a vinyl group, an isopropenyl group, an allyl group, an acryloyl group and a methacryloyl group.

Specific examples of the styrene monomer include styrene, α-methylstyrene, 4-methylstyrene, 4-ethylstyrene, 4-tert-butylstyrene, 4-methoxystyrene, 4-ethoxystyrene, 4-carboxystyrene and metal salts thereof; 4-styrenesulfonic acid and metal salts thereof 1-vinylnaphthalene, 2-vinylnaphthalene, allylbenzene, phenoxyalkylene glycol acrylate, phenoxyalkylene glycol methacrylate, phenoxypolyalkylene glycol acrylates and phenoxypolyalkylene glycol methacrylates. Of these, preferably, styrene is mainly used since it is easily available, and has excellent reactivity and high chargeability.

Also, in the monomer mixture, the amount of an acid monomer used in the vinyl resin is 0% by mass to 7% by mass, preferably 0% by mass to 4% by mass, more preferably 0% by mass; i.e., no acid monomer is contained. When the amount thereof exceeds 7% by mass, the obtained vinyl fine resin particles themselves have high dispersion stability. Thus, when such vinyl fine resin particles are added to the dispersion liquid containing oil droplets dispersed in the aqueous phase, they are difficult to attach thereonto at ambient temperature. Or, even when the vinyl fine resin particles have been attached thereonto, they tend to be exfoliated through the process of solvent removal, washing, drying and treating with external additives. Whereas when the amount thereof is 4% by mass or less, the obtained toner particles less changes in chargeability depending on the working environment.

Here, the acid monomer refers to a compound having an acid group in addition to the vinyl polymerizable functional group. The acid group includes carboxylic acid, sulfonic acid and phosphoric acid.

The acid monomer includes carboxyl group-containing vinyl monomers and salts thereof (e.g., (meth)acrylic acid, maleic acid or maleic anhydride, monoalkyl maleates, fumaric acid, monoalkyl fumarates, crotonic acid, itaconic acid, monoalkyl itaconate, glycol itaconate monoethers, citraconic acid, monoalkyl citraconates and cinnamic acid), sulfonic acid group-containing vinyl monomers and salts thereof, vinyl-based sulfuric acid monoesters and salts thereof, and phosphoric acid group-containing vinyl monomers and salts thereof. Of these, preferred are (meth)acrylic acid, maleic acid or maleic anhydride, monoalkyl maleates, fumaric acid and monoalkyl fumarates. Also, a monomer having an ethylene oxide (EO) chain may be used for controlling compatibility to the toner core particles. Examples of the monomer having an ethylene oxide (EO) chain include phenoxy alkylene glycol acrylate, phenoxy alkylene glycol methacrylate, phenoxy polyalkylene glycol acrylate, phenoxy polyalkylene glycol methacrylate. The amount of the monomer having an ethylene oxide (EO) chain used is not particularly limited and may be appropriately selected depending on the intended purpose, but generally 10% by mass or less, preferably 5% by mass or less, more preferably 2% by mass or less, relative to the total amount of the monomers. When the amount thereof exceeds 10% by mass, an increased number of polar groups on the toner surface considerably degrade charge stability to the environment. In addition, the compatibility to the toner core particles becomes too high, resulting in that the surface modification cannot exert a sufficient effect because of low coverage rate of the protrusions. Needless to say, both cases are not preferred. Also, a monomer having an ester bond (e.g., 2-acryloyloxyethyl succinate or 2-methacryloyloxyethyl phthalate) may simultaneously be used for controlling compatibility of the toner core particles. In this case, the amount of such a monomer used is not particularly limited and may be appropriately selected depending on the intended purpose, but generally 10% by mass or less, preferably 5% by mass or less, more preferably 2% by mass or less, relative to the total amount of the monomers. When the amount thereof is 10% by mass or more, an increased number of polar groups on the toner core surface considerably degrade charge stability to the environment, which is not preferred. In addition, the compatibility to the toner core particles becomes too high, resulting in that the surface modification cannot exert a sufficient effect because of low coverage rate of the protrusions.

The method for obtaining the vinyl fine resin particles is not particularly limited, and exemplified by the following methods (a) to (f);

(a) a method in which a monomer mixture is allowed to undergone polymerization reaction with a suspension polymerization method, an emulsification polymerization method, a seed polymerization method or a dispersion polymerization method, to thereby produce a dispersion liquid of vinyl fine resin particles;

(b) a method in which a monomer mixture is allowed to undergone polymerization, and the obtained resin is then pulverized using a fine pulverizer of, for example, mechanically rotating type or jetting type, followed by classifying, to thereby produce fine resin particles;

(c) a method in which a monomer mixture is allowed to undergone polymerization, and the obtained resin is then dissolved in a solvent, followed by spraying of the resultant resin solution, to thereby produce fine resin particles;

(d) a method in which a monomer mixture is allowed to undergone polymerization, the obtained resin is dissolved in a solvent, another solvent is added to the resultant resin solution to precipitate fine resin particles, and then the solvent is removed to obtain fine resin particles; or a method in which a monomer mixture is allowed to undergone polymerization, the obtained resin is dissolved in a solvent with heating, the resultant resin solution is cooled to precipitate fine resin particles, and then the solvent is removed to obtain fine resin particles;

(e) a method in which a monomer mixture is allowed to undergone polymerization, the obtained resin is dissolved in a solvent, the resultant resin solution is dispersed in an aqueous medium in the presence of an appropriate dispersing agent, and then the dispersion liquid is, for example, heated or left under reduced pressure; and (f) a method in which a monomer mixture is allowed to undergone polymerization, the obtained resin is dissolved in a solvent, an appropriate emulsifying agent is dissolved in the resultant resin solution, followed by phase-transfer emulsification with the addition of water.

Of these, method (a) is preferably employed, since vinyl fine resin particles can be easily produced as a dispersion liquid, which is easy to use for the next step.

In the polymerization reaction of method (a), preferably, (i) a dispersion stabilizer is added to the aqueous medium, (ii) the monomer mixture to be allowed to undergone polymerization reaction is made to contain a monomer capable of imparting dispersion stability to the fine resin particles obtained through polymerization (i.e., a reactive emulsifier) or the above (i) and (ii) are performed in combination, to thereby impart dispersion stability to the obtained vinyl fine resin particles. When neither the dispersion stabilizer nor the reactive emulsifier is used, the particles cannot be maintained in a dispersion state whereby the vinyl resin cannot be obtained as fine particles, the obtained fine resin particles are poor in dispersion stability whereby they are poor in storage stability resulting in aggregation during storage, or the particles are degraded in dispersion stability at the below-described fine resin particle-attaching step whereby the core particles easily aggregate or combined together resulting in that the finally obtained colored resin particles is degraded in evenness of, for example, particle diameter, shape, and surface, which is not preferred.

The glass transition temperature (Tg) of the vinyl resin is 45° C. to 100° C., preferably 55° C. to 90° C., more preferably 65° C. to 80° C. When stored under high-temperature and high-humidity environment, atmospheric moisture may plasticize the resin in the protrusions to thereby decrease the glass transition temperature. Presumably, the toner or toner cartridge is transported under high-temperature, high-humidity environment of 40° C. and 90%. Thus, when the glass transition temperature is lower than 45° C., the obtained colored resin particles are deformed under application of a certain pressure or stick to each other. As a result, there is a possibility that the toner particles cannot behave as particles. In addition, when used for a one-component developer, the toner becomes poor in durability. Whereas when the Tg exceeds 100° C., the low-temperature fixing property is degraded. Needless to say, both cases are not preferred.

—Preparation Step of Oil Phase—

The oil phase, which contains an organic solvent, and materials such as a binder resin and a colorant dissolved or dispersed in the organic solvent, may be prepared in the following manner (preparation step of oil phase). Specifically, the materials such as the binder resin and the colorant are gradually added to the organic solvent under stirring so that these materials are dissolved or dispersed therein. Notably, when a pigment is used as the colorant and/or when materials such as the releasing agent and the charge controlling agent used are poorly dissolvable to the organic solvent, the particles of these materials are preferably micronized before the addition to the organic solvent.

As described above, the colorant may be formed into a masterbatch. Similarly, the materials such as the releasing agent and the charge controlling agent may be formed into a masterbatch.

In another means, the colorant, the releasing agent and the charge controlling agent may be dispersed through a wet process in the organic solvent, if necessary in the presence of a dispersion aid, to thereby obtain a wet master.

In still another means, when dispersing the materials melted at a temperature lower than the boiling point of the organic solvent, they are heated under stirring in the organic solvent, if necessary in the presence of a dispersion aid to be stirred together with the dispersoids; and the resultant solution is cooled with stirring or shearing so that the dissolved materials are crystallized, to thereby produce microcrystals of the dispersoids.

After the colorant, releasing agent and charge controlling agent, dispersed with any of the above means, have been dissolved or dispersed in the organic solvent together with a resin, the resultant mixture may be further dispersed. The dispersion may be performed using a known disperser such as a bead mill or a disc mill.

—Preparation Step of Toner Core Particles—

No particular limitation is imposed on the method for preparing a dispersion liquid containing toner core particles formed of the oil phase by dispersing the oil phase obtained at the above-described step in the aqueous medium containing at least the surfactant (preparation step of toner core particles). This method may use a known disperser such as a low-speed shearing disperser, a high-speed shearing disperser, a friction disperser, a high-pressure jet disperser or an ultrasonic disperser. Among them, a high-speed shearing disperser is preferably used to form dispersoids having a particle diameter of 2 μm to 20 μm. The rotation speed of the high-speed shearing disperser is not particularly limited but is generally 1,000 rpm to 30,000 rpm, preferably 5,000 rpm to 20,000 rpm. The dispersion time is not particularly limited but is generally 0.1 min to 5 min in a batch method. When the dispersion time exceeds 5 min, unfavorable small particles remain and excessive dispersion is performed to make the dispersion system unstable, potentially forming aggregates and coarse particles, which is not preferred. The dispersion temperature is generally 0° C. to 40° C., preferably 10° C. to 30° C. When the dispersion temperature exceeds 40° C., molecular movements are excited to degrade dispersion stability, easily forming aggregates and coarse particles, which is not preferred. Whereas when the dispersion temperature is lower than 0° C., the dispersion liquid is increased in viscosity to require elevated energy for dispersion, leading to a drop in production efficiency. The surfactant usable may be the same as those mentioned in the above-described production method of the fine resin particles. In order to efficiently disperse the oil droplets containing the solvent, the surfactant used is preferably a disulfonic acid salt having a relatively high HLB. The concentration of the surfactant in the aqueous medium is 1% by mass to 10% by mass, more preferably 2% by mass to 8% by mass, more preferably 3% by mass to 7% by mass. When the concentration thereof exceeds 10% by mass, each oil droplet becomes too small and also has a reverse micellar structure. Thus, the dispersion stability is degraded due to the surfactant added in such an amount, to thereby easily form coarse oil droplets. Whereas when the concentration thereof is lower than 1% by mass, the oil droplets cannot be stably dispersed to form coarse oil droplets. Needless to say, both cases are not preferred.

—Preparation Step of Toner Particles—

The dissolution suspension method may be performed as described above. However, the following method is preferably employed since the fine resin particles are attached onto or fused with the toner core particles more firmly. Specifically, the method includes dissolving or dispersing materials of the toner core particles in an organic solvent to prepare an oil phase, dispersing the oil phase in an aqueous medium, and adding fine resin particles so as to be attached onto and fused with the surfaces of liquid droplets of the oil phase. Addition of the fine resin particles at the production step of toner core particles forms large, ununiform protrusions, which cannot be preferred in some cases.

The obtained toner core particle dispersion liquid contains stable liquid droplets of the core particles, so long as the dispersion liquid is being stirred. For attaching the fine resin particles onto the toner core particles, the fine resin particle dispersion liquid is added to this core particle slurry. The period for which the vinyl fine resin particle dispersion liquid as the fine resin particle dispersion liquid is added is 30 sec or longer. When it is added for 30 sec or shorter, the dispersion system drastically changes to form aggregated particles. In addition, the vinyl fine resin particles are ununiformly attached onto the core particles, which is not preferred. Meanwhile, adding the vinyl fine resin particle dispersion liquid over an unnecessarily long period of time (e.g., 60 min or longer) cannot be preferred in some cases from the viewpoint of lowering production efficiency.

Before added to the core particle dispersion liquid, the vinyl fine resin particle dispersion liquid may be appropriately diluted or concentrated so as to have a desired concentration. The concentration of the vinyl fine resin particle in the vinyl fine resin particle dispersion liquid is preferably 5% by mass to 30% by mass, more preferably 8% by mass to 20% by mass. When the concentration is less than 5% by mass, the concentration of the organic solvent greatly changes upon addition of the dispersion liquid to lead to insufficient attachment of the fine resin particles, which cannot be preferred in some cases. Also, when the concentration exceeds 30% by mass, the fine resin particles tend to be localized in the core particle dispersion liquid, resulting in that the fine resin particles are ununiformly attached onto the core particles, which cannot be preferred in some cases.

Also, for the production of liquid droplets of the oil phase, the amount of the surfactant contained in the aqueous phase is 7% by mass or less, preferably 6% by mass or less, more preferably 5% by mass or less. When the amount of the surfactant exceeds 7% by mass, the length of the long sides of the protrusions becomes considerably ununiform, which cannot be preferred in some cases.

The following may explain the reason why the vinyl fine resin particles are sufficiently firmly attached onto the toner core particles by the method of the present invention. Specifically, when the vinyl fine resin particles are attached onto the liquid droplets of the toner core particles, the toner core particles can freely deform to sufficiently form contact surfaces with the vinyl fine resin particles and the vinyl fine resin particles are swelled with or dissolved in the organic solvent to make it easier for the vinyl fine resin particles to adhere to the resin in the toner core particles. Therefore, in this state, the organic solvent must exist in the system in a sufficiently large amount. Specifically, in the toner core particle dispersion liquid, the amount of the organic solvent is generally 50% by mass to 150% by mass, preferably 70% by mass to 125% by mass, relative to the amount of the solid matter (e.g., resin, colorant, if necessary, releasing agent and charge controlling agent). When the amount of the organic solvent exceeds 150% by mass, the amount of the toner particles obtained through one production process is reduced, resulting in low production efficiency. Also, a large amount of the organic solvent impairs dispersion stability, making it difficult to attain stable production, which cannot be preferred in some cases.

The temperature at which the vinyl fine resin particles are made to attach onto the core particles is 10° C. to 60° C., preferably 20° C. to 45° C. When it exceeds 60° C., required energy for production is elevated to increase environmental loading, and the presence of vinyl fine resin particles having a low acid value on the surfaces of liquid droplets makes the dispersion system to be unstable to thereby potentially form coarse particles. Meanwhile, when the temperature is less than 10° C., the dispersion liquid is increased in viscosity, leading to an insufficiently attachment of the fine resin particles. Needless to say, both cases are not preferred.

The rate of the fine resin particles relative to the total mass of the toner is 1% to 20%, preferably 3% to 15%, more preferably 5% to 10%. When the rate thereof is 1% or less, satisfactory effects cannot be obtained. Whereas when the rate thereof is 20% or more, excessive fine resin particles are weakly attached onto the toner core particles, causing filming or other unfavorable phenomena.

In addition, the fine resin particles may be mixed with the toner core particles under stirring to mechanically adhere to and cover the toner core particles.

—Desolvation Step—

In one employable means for removing the organic solvent from the obtained toner particle dispersion liquid, the entire system is gradually increased in temperature with stirring, to thereby completely evaporate off the organic solvent contained in the liquid droplets.

In another employable means, the obtained toner particle dispersion liquid with stirring is sprayed toward a dry atmosphere, to thereby completely evaporate off the organic solvent contained in the liquid droplets. In still another employable means, the toner particle dispersion liquid is reduced in pressure with stirring to evaporate off the organic solvent. The latter two means may be used in combination with the first means.

The dry atmosphere toward which the emulsified dispersion liquid is sprayed generally uses heated gas (e.g., air, nitrogen, carbon dioxide and combustion gas), especially, gas flow heated to a temperature equal to or higher than the highest boiling point of the solvents used. By removing the organic solvent even in a short time using, for example, a spray dryer, a belt dryer or a rotary kiln, the resultant product has satisfactory quality.

—Aging Step—

When a modified resin having an end isocyanate group is added, an aging step may be performed to allow elongation and/or crosslinking reaction of the isocyanate to proceed. The aging time is generally 10 min to 40 hours, preferably 2 hours to 24 hours. The aging temperature is generally 0° C. to 65° C., preferably 35° C. to 50° C.

—Washing Step—

The dispersion liquid of the toner particles obtained in the above-described manner contains not only the toner particles but also such subsidiary materials as the surfactant and dispersing agent. Thus, the dispersion liquid is washed to separate the toner particles from the subsidiary materials. Examples of the washing method of the toner particles include a centrifugation method, a reduced-pressure filtration method and a filter press method, but employable washing methods in the present invention are not limited thereto. Any of the above methods forms a cake of the toner particles. If the toner particles are not sufficiently washed through only one washing process, the formed cake may be dispersed again in an aqueous solvent to form a slurry, which is repeatedly treated with any of the above methods to taken out the toner particles. When a reduced-pressure filtration method or a filter press method is employed for washing, an aqueous solvent may be made to penetrate the cake to wash out the subsidiary materials contained in the toner particles. The aqueous solvent used for washing is water or a solvent mixture of water and an alcohol such as methanol or ethanol. Use of water is preferred from the viewpoint of reducing cost and environmental load caused by, for example, drainage treatment.

—Drying Step—

The washed toner particles containing the aqueous medium in a large amount are dried to remove the aqueous medium, whereby only toner particles can be obtained. The drying method uses, for example, a spray dryer, a vacuum freezing dryer, a reduced-pressure dryer, a ventilation shelf dryer, a movable shelf dryer, a fluidized-bed-type dryer, a rotary dryer or a stirring-type dryer. The toner particles are preferably dried until the water content is finally decreased less than 1% by mass. Also, when the dry toner particles flocculate to cause inconvenience in use, the flocculated particles may be separated from each other through beating using, for example, a jet mill, HENSCHEL MIXER, a super mixer, a coffee mill, an oster blender or a food processor.

<Particle Diameter of Toner Particle>

The toner particles of the present invention preferably have a volume average particle diameter of 3 μm to 9 μm, preferably 4 μm to 8 μm, more preferably 4 μm to 7 μm, in order for the toner particles to be changed uniformly and sufficiently. The toner particles having a volume average particle diameter less than 3 μm are relatively increased in toner adhesion force, which cannot be preferred in some cases since the toner operability is reduced under an electrical field. The toner particles having a volume average particle diameter exceeding 9 μm form an image whose image qualities (e.g., reproducibility of thin lines) may be degraded.

Also, in the toner particles, the ratio of the volume average particle diameter to the number average particle diameter (volume average particle diameter/number average particle diameter) is preferably 1.25 or less, more preferably 1.20 or less, still more preferably 1.17 or less. When the ratio therebetween exceeds 1.25; i.e., the toner particles have low uniformity in particle diameter, the size or height of the protrusions tends to be varied. In addition, during repetitive use, toner particles having a large particle diameter or, in some cases, toner particles having small particle diameter are preferentially consumed, so that the average particle diameter of the toner particle remaining in the developing device is changed from that of the toner particles at an initial state. Thus, the developing conditions initially set are not optimal for development of the remaining toner particles. As a result, various unfavorable phenomena tend to occur including charging failure, considerable increase or decrease of the amount of toner particles conveyed, toner clogging and toner leakage.

Examples of employable apparatus for measuring the particle size distribution of the toner particles include a Coulter Counter TA-II and Coulter Multisizer II (these products are of Coulter, Inc.). The measurement method will next be described.

First, a surfactant (0.1 mL to 5 mL), preferably an alkylbenzene sulfonic acid salt, is added as a dispersing agent to an electrolyte solution (100 mL to 150 mL). Here, the electrolyte solution is an about 1% by mass aqueous NaCl solution prepared using 1st grade sodium chloride, and examples of commercially available products thereof include ISOTON-II (product of Coulter, Inc.). Subsequently, a measurement sample (2 mg to 20 mg) is suspended in the above-obtained electrolyte solution. The resultant electrolyte solution is dispersed with an ultrasonic wave disperser for about 1 min to about 3 min. The thus-obtained dispersion liquid is analyzed with the above-described apparatus using an aperture of 100 μm to measure the number or volume of the toner particles. Then, the volume particle size distribution and number particle size distribution are calculated from the obtained values. From these distributions, the volume average particle diameter (D4) and number average particle diameter of the toner (D1) can be obtained.

Notably, in this measurement, 13 channels are used: 2.00 μm (inclusive) to 2.52 μm (exclusive); 2.52 μm (inclusive) to 3.17 μm (exclusive); 3.17 μm (inclusive) to 4.00 μm (exclusive); 4.00 μm (inclusive) to 5.04 μm (exclusive); 5.04 μm (inclusive) to 6.35 μm (exclusive); 6.35 μm (inclusive) to 8.00 μm (exclusive); 8.00 μm (inclusive) to 10.08 μm (exclusive); 10.08 μm (inclusive) to 12.70 μm (exclusive); 12.70 μm (inclusive) to 16.00 μm (exclusive); 16.00 μm (inclusive) to 20.20 μm (exclusive); 20.20 μm (inclusive) to 25.40 μm (exclusive); 25.40 μm (inclusive) to 32.00 μm (exclusive); and 32.00 μm (inclusive) to 40.30 μm (exclusive); i.e., particles having a particle diameter of 2.00 μm (inclusive) to 40.30 μm (exclusive) are subjected to the measurement.

<Shape of Toner Particle>

The average sphericity of the toner particles is not particularly limited and may be appropriately selected depending on the intended purpose, but generally 0.930 or more, preferably 0.950 or more, more preferably 0.970 or more. When the average sphericity is less than 0.930, the external additives are accumulated in concave portions to prevent the silicone oil from sufficiently spreading. Also, the toner having an average sphericity less than 0.930 is poor in flowability to easily cause failures upon development as well as to be degraded in transfer efficiency. Needless to say, both cases are not preferred.

The average sphericity of the toner particles can be measured using a flow-type particle image analyzer FPIA-2000. Specifically, 0.1 mL to 0.5 mL of a surfactant (preferably an alkylbenzene sulfonic acid salt) is added as a dispersing agent into 100 mL to 150 mL of water in a container, from which solid impurities have previously been removed. Then, about 0.1 g to about 0.5 g of a measurement sample is added to the container, followed by dispersing. The resultant suspension is subjected to dispersing treatment by an ultrasonic disperser for about 1 min to about 3 min, and the concentration of the dispersion liquid is adjusted such that the number of particles of the sample is 3,000 per microliter to 10,000 per microliter. In this state, the shape and distribution of the toner are measured using the analyzer.

In the case of the toner produced by the wet granulation method, ionic toner materials are localized in the vicinity of the surface of the toner. As a result, the surface layer of the toner is relatively low in resistance to improve the toner in charging speed and charge rising property. However, such toner has poor charge retentability; in other words, it is easy for the charge amount of the toner to rapidly decrease. The method for improving this problem is, for example, a method in which a surface modifier is allowed to be supported on the surface of the toner.

<Measurement of Particle Diameter of Resin Particles>

The volume average particle diameter of the fine resin particles was measured using UPA-150EX (product of NIKKISO CO., LTD.).

The fine resin particles preferably have a volume average particle diameter of 50 nm to 200 nm, more preferably 80 nm to 160 nm, particularly preferably 100 nm to 140 nm. When the particle diameter is smaller than 50 nm, it is difficult to form sufficiently large protrusions on the toner surface. When the particle diameter exceeds 200 nm, the formed protrusions become ununiform, which cannot be preferred in some cases. Also, in the fine resin particles, the ratio of the volume average particle diameter to the number average particle diameter (volume average particle diameter/number average particle diameter) is preferably 1.25 or less, more preferably 1.20 or less, still more preferably 1.17 or less. When the particle diameter of the fine resin particles exceeds 1.25; i.e., the fine resin particles are poor in uniformity of particle diameter, the size of the formed protrusions tend to be varied.

<Measurement of Molecular Weight (GPC)>

The molecular weight of the resin was measured through GPC (gel permeation chromatography) under the following conditions.

Apparatus: GPC-150C (product of Waters Co.)
Column: KF801 to 807 (product of Shodex Co.)
Temperature: 40° C.
Solvent: THF (tetrahydrofuran)
Flow rate: 1.0 mL/min
Sample injected: 0.1 mL of a sample having a concentration of 0.05% to 0.6%

From the molecular weight distribution of the resin measured under the above conditions, the number average molecular weight and the weight average molecular weight of the resin were calculated using a molecular weight calibration curve obtained from monodispersed polystyrene standard samples. The standard polystyrene samples used for obtaining the calibration curve were toluene and Std. Nos. S-7300, S-210, S-390, S-875, S-1980, S-10.9, S-629, S-3.0 and S-0.580 of Showdex STANDARD (product of SHOWA DENKO K.K.). The detector used was a RI (refractive index) detector.

<Measurement of Glass Transition Temperature (Tg) (DSC)>

The Tg was measured using TG-DSC system TAS-100 (product of Rigaku Denki Co., Ltd.).

A sample (about 10 mg) is placed in an aluminum container, which is placed on a holder unit. The holder unit is then set in an electric oven. The sample is heated from room temperature to 150° C. at a temperature increasing rate of 10° C./min, left to stand at 150° C. for 10 min, cooled to room temperature, and left to stand for 10 min. In a nitrogen atmosphere, the sample is heated again to 150° C. at a temperature increasing rate of 10° C./min for DSC analysis. Using the analysis system of TAS-100 system, the Tg is calculated from the tangent point between the base line and the tangential line of the endothermic curve near the Tg.

<Measurement of Concentration of Solid Matter>

The concentration of solid matter contained in the oil phase was measured as follows.

An aluminum plate (about 1 g to about 3 g) is accurately weighed in advance. About 2 g of the oil phase is placed on the aluminum plate within 30 sec, and then the oil phase placed thereon is accurately weighed. The aluminum plate is placed for 1 hour in an oven set to 150° C. to evaporate the solvent. Thereafter, the aluminum plate is taken out from the oven and left to cool. Subsequently, the total mass of the aluminum plate and solid matter of the oil phase is measured with an electronic balance. The mass of the aluminum plate is subtracted from the total mass of the aluminum plate and the solid matter contained in the oil phase to obtain the mass of the solid matter contained in the oil phase, which is divided by the mass of the oil phase placed on the aluminum plate to obtain the concentration of the solid matter contained in the oil phase. Also, the ratio of the solvent to the solid matter contained in the oil phase is a value obtained from the following: (the mass of the oil phase—the mass of the solid matter contained in the oil phase); i.e., the mass of the solvent/the mass of the solid matter contained in the oil phase.

<Measurement of Acid Value>

The acid value of the resin is measured according to JIS K1557-1970, which will be specifically described below.

About 2 g of a pulverized sample is accurately weighed (W (g)). The sample is added to a 200 mL conical flask. Then, 100 mL of a solvent mixture of toluene/ethanol (2:1 by mass) is added to the flask. The resultant mixture is left to stand for 5 hours for dissolution. A phenolphthalein solution serving as an indicator is added to the solution.

The resultant solution is titrated with 0.1N alcohol solution of potassium hydroxide. The amount of the KOH solution is defined as S (mL).

A blank test is performed, and the amount of the KOH solution is defined as B (mL).

The acid value is calculated using the following equation:

$$\text{Acid value} = [(S-B) \times f \times 5.61]/W$$

where f denotes a factor of the KOH solution.

<As to Long Side and Coverage Rate of Protrusions>

The toner particles are observed under a scanning electron microscope (SEM). The obtained SEM image is used to measure lengths of long sides of the protrusions of each toner particle and a coverage rate of the protrusions on each toner particle.

Next, description will be given to the calculation methods for long sides and coverage rate of the protrusions described in Examples.

Figure 7:
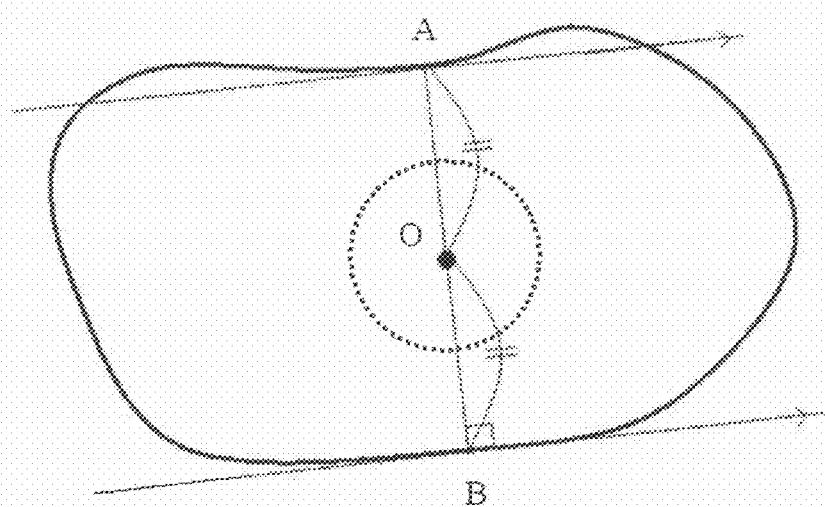
FIG. 7 is a sketch used for explaining a calculation method for a coverage rate of protrusions on a surface of a toner particle in the present invention.

First, the calculation method for long sides will be described. As illustrated in FIG. 7, the shortest length between two parallel straight lines in contact with the toner particle is determined, and the contact points are defined as A and B. Then, the area of a circle having as a center the center O of the line segment AB and having as a diameter the length of the line segment AO is calculated. The total area of the protrusions contained in the circle was calculated to obtain a coverage rate of the protrusions on the toner particle (i.e., the total area of the protrusions/the area of the circle).

One hundred or more toner particles were calculated for coverage rate with the above method, and then the obtained coverage rates were averaged.

The lengths of the long sides of the protrusions can be measured as follows, for example. The SEM image depicted in FIG. 1A is more magnified to measure the longest length of line segments connecting together any two points on the circumference of one protrusion.

The average length of the long sides was obtained by measuring the lengths of the long sides of 100 or more protrusions on at least one toner particle and averaging them. The area of the protrusions, the long side of the protrusions, and sphericity were measured with an image analysis-type particle size distribution analyzing software "MAC-VIEW" (product of Mountech Co., Ltd.). The measuring methods for the length of the long side of the protrusion and the area of the protrusion are not particularly limited and may be appropriately selected depending on the intended purpose.

The average of the lengths of the long sides of the protrusions is 0.10 μm or more but less than 0.50 μm, preferably 0.10 μm to 0.30 μm, more preferably 0.20 μm to 0.30 μm. When it is 0.50 μm or more, the protrusions on the surface become sparse and the surface area becomes small. As a result, the number of firmly supported external additives is small, which is not preferred. The standard deviation of the lengths of the long sides of the protrusions is 0.20 or less, preferably 0.10 or less. When it is more than 0.20, the size of the protrusions on the surface becomes ununiform and the surface area is not expected to increase, which is not preferred.

The coverage rate is 30% to 90%, preferably 40% to 80%, more preferably 50% to 70%. When the coverage rate is less than 30% or more than 90%, the number of firmly supported external additives is small, which is not preferred.

<Measurement of Charge Amount>

The charge amount can be measured using a blow-off device described in JP-B No. 3487464. Specifically, 25 g of a carrier for IMAGIO NEO C600 (product of Ricoh Company, Ltd.) and 0.05 g of a sample are mixed together with a roll mill for 5 min, and 2.0 g of the resultant mixture is introduced to the blow-off device.

Table 1 shows the measurement results obtained with the above method. Reference "+" or "−" denotes polarity of charges, and the number of references "+" or "−" indicates an absolute amount of charges.

(Toner Container)

A toner container of the present invention contains therein the toner of the present invention.

The container is not particularly limited and may be determined depending on the intended purpose so long as it is contains the toner, but is preferably a container including a toner container body and a cap.

The size, shape, structure and material of the toner container body are not particularly limited and may be determined depending on the intended purpose. For example, the shape is preferably a cylindrical shape, and particularly preferably a shape in which spiral irregularity is formed on the internal periphery and the toner as the content can be migrated to the side of a discharge port and also a portion or all of the spiral section has a bellow function.

The material of the toner container body is not particularly limited and may be determined depending on the intended purpose, but is preferably excellent in dimensional accuracy. It is preferably a resin. For example, preferable are polyester resins, polyethylene resins, polypropylene resins, polystyrene resins, polyvinyl chloride resins, polyacrylic resins, polycarbonate resins, ABS resins and polyacetal resins.

The toner container is easily stored and transported and is excellent in handling properties, and also can be preferably used to refill the toner by detachably attaching to the process cartridge or the image forming apparatus of the present invention described below.

(Developer)

The developer of the present invention includes at least the toner of the present invention, and, if necessary, further includes other components such as a carrier.

The developer may be a one-component developer or a two-component developer.

<Carrier>

The carrier is not particularly limited and may be determined depending on the intended purpose, and preferably includes a resin layer and a core material coated with the resin layer.

—Core Material—

The material of the core material is not particularly limited and may be determined depending on the intended purpose. Examples thereof include a manganese-strontium-based material or manganese-magnesium-based material of 50 emu/g to 90 emu/g. In view of securing image density, a highly magnetized material such as iron powder (100 emu/g or more) or magnetite (75 emu/g to 120 emu/g) is preferable. Also, a weakly magnetized material such as copper-zinc-based material (30 emu/g to 80 emu/g) is preferable because the impact of a developer having brush-like shape against a photoconductor can be decreased, and it is advantageous to form a high quality image.

These materials may be used alone or in combination.

The volume average particle diameter of the core material is not particularly limited and may be determined depending on the intended purpose, but is preferably from 10 µm to 150 µm, and more preferably from 40 µm to 100 µm. When the volume average particle diameter is less than 10 µm, the amount of fine powders in the carrier increases and magnetization per one particle decreases, and thus carrier scatter may occur. Meanwhile, when the average particle diameter exceeds 150 µm, the specific surface area decreases and scatter of the toner may occur. In case of full color including many solid portions, reproduction of the solid portion may deteriorate.

—Resin Layer—

The material of the resin layer is not particularly limited and may be appropriately selected from known resins according to the purposes. Examples thereof include amino-based resins, polyvinyl-based resins, polystyrene-based resins, polyhalogenated olefin resins, polyester-based resins, polycarbonate-based resins, polyethylene resins, polyvinyl fluoride resins, polyvinylidene fluoride resins, polytrifluoroethylene resins, polyhexafluoropropylene resins, copolymers of polyvinylidene fluoride and an acryl monomer, copolymers of polyvinylidene fluoride and vinyl fluoride, a fluoroterpolymers such as terpolymers of tetrafluoroethylene, polyvinylidene fluoride and a monomer having no fluoro-group, and silicone resins. These materials may be used alone or in combination.

The amino-based resin is not particularly limited and may be determined depending on the intended purpose. Examples thereof urea-formaldehyde resins, melamine resins, benzoguanamine resins, urea resins, polyamide resins, and epoxy resins.

The polyvinyl-based resin is not particularly limited and may be determined depending on the intended purpose. Examples thereof include acrylic resins, polymethylmethacrylate, polyacrylonitrile, polyvinyl acetate, polyvinyl alcohol, and polyvinyl butylal.

The polystyrene-based resin is not particularly limited and may be determined depending on the intended purpose. Examples thereof include polystyrene and styrene-acrylic copolymer.

The polyhalogenated olefin is not particularly limited and may be determined depending on the intended purpose. Examples thereof include polyvinyl chloride.

The polyester-based resin is not particularly limited and may be determined depending on the intended purpose. Examples thereof include polyethylene-telephthalate and polybutylene terephthalate.

If necessary, the resin layer may contain a conductive powder. The conductive powder is not particularly limited and may be determined depending on the intended purpose. Examples thereof include metal powder, carbon black, titanium oxide, tin oxide and zinc oxide. The average particle diameter of the conductive powder is preferably 1 µm or less. When the average particle diameter is more than 1 µm, it may become difficult to control the electrical resistance.

The resin layer can be formed by dissolving the silicone resin in a solvent to prepare a coating solution and coating the coating solution on the surface of the core material using a known coating method, followed by drying and further baking.

The coating method is not particularly limited and may be determined depending on the intended purpose. Examples thereof include a dip coating method, a spraying method and a brush coating method.

The solvent is not specifically limited and can be appropriately selected according to the purposes. Examples thereof include toluene, xylene, methyl ethyl ketone, methyl isobutyl ketone, butyl acetate, and cellosolve.

The baking method may be a method using an external heating system or an internal heating system. Examples thereof include a method using a fixed type electric furnace, a flow type electric furnace, a rotary electric furnace or a burner furnace, and a method using microwave.

The amount of the resin layer in the carrier is not particularly limited and may be determined depending on the intended purpose, but is preferably from 0.01% by mass to 5.0% by mass. When the amount is less than 0.01% by mass, a uniform resin layer cannot be formed on the surface of the core material in some cases. On the other hand, when the amount exceeds 5.0% by mass, since the resulting resin layer has too thick to fuse carriers with each other and uniform carrier particles cannot be obtained in some cases.

(Image Forming Apparatus, Process Cartridge, and Image Forming Method)

An image forming apparatus of the present invention includes a latent image bearing member (hereinafter also referred to a "photoconductor"), a charging unit, an exposing unit, a toner, a developing unit, a transfer unit and a fixing unit; and, if necessary, further includes appropriately selected other units.

An image forming method of the present invention includes a charging step, an exposing step, a developing step, a transfer step and a fixing step; and, if necessary, further includes appropriately selected other steps.

The latent image bearing member and the developing unit being integrally supported in the process cartridge of the present invention which is mounted detachably to an image forming apparatus, The charging unit is not particularly limited and may be determined depending on the intended purpose, so long as it is a unit configured to uniformly charge the surface of the latent image bearing member.

The exposing unit is not particularly limited and may be determined depending on the intended purpose, so long as it is a unit configured to expose the charged surface of the latent image bearing member to light based on the image data to form a latent electrostatic image.

The developing unit is not particularly limited and may be determined depending on the intended purpose, so long as it is a unit configured to supply a toner to the latent electrostatic image formed on the surface of the latent image bearing member to develop the latent electrostatic image, to thereby form a visible image.

The transfer unit is not particularly limited and may be determined depending on the intended purpose, so long as it is a unit configured to transfer the visible image from the latent image bearing member surface onto an image-receiving medium.

The fixing unit is not particularly limited and may be determined depending on the intended purpose, so long as it is a unit configured to fix the visible image on the image-receiving medium.

The charging step is not particularly limited and may be determined depending on the intended purpose, so long as it is a step of uniformly charging the surface of the latent image bearing member.

The exposing step is not particularly limited and may be determined depending on the intended purpose, so long as it is a step of exposing the charged surface of the latent image bearing member based on the image data to form a latent electrostatic image.

The developing step is not particularly limited and may be determined depending on the intended purpose, so long as it is a step of developing, with a toner, the latent electrostatic image formed on the surface of the latent image bearing member to form a visible image.

The transfer step is not particularly limited and may be determined depending on the intended purpose, so long as it is a step of transfer the visible image on the latent image bearing member surface onto an image-receiving medium.

The fixing step is not particularly limited and may be determined depending on the intended purpose, so long as it is a step of fixing the visible image on the image-receiving medium.

The toner is a toner which forms the visible image from the latent electrostatic image and the toner of the present invention.

<Image Forming Apparatus>

Figure 2:
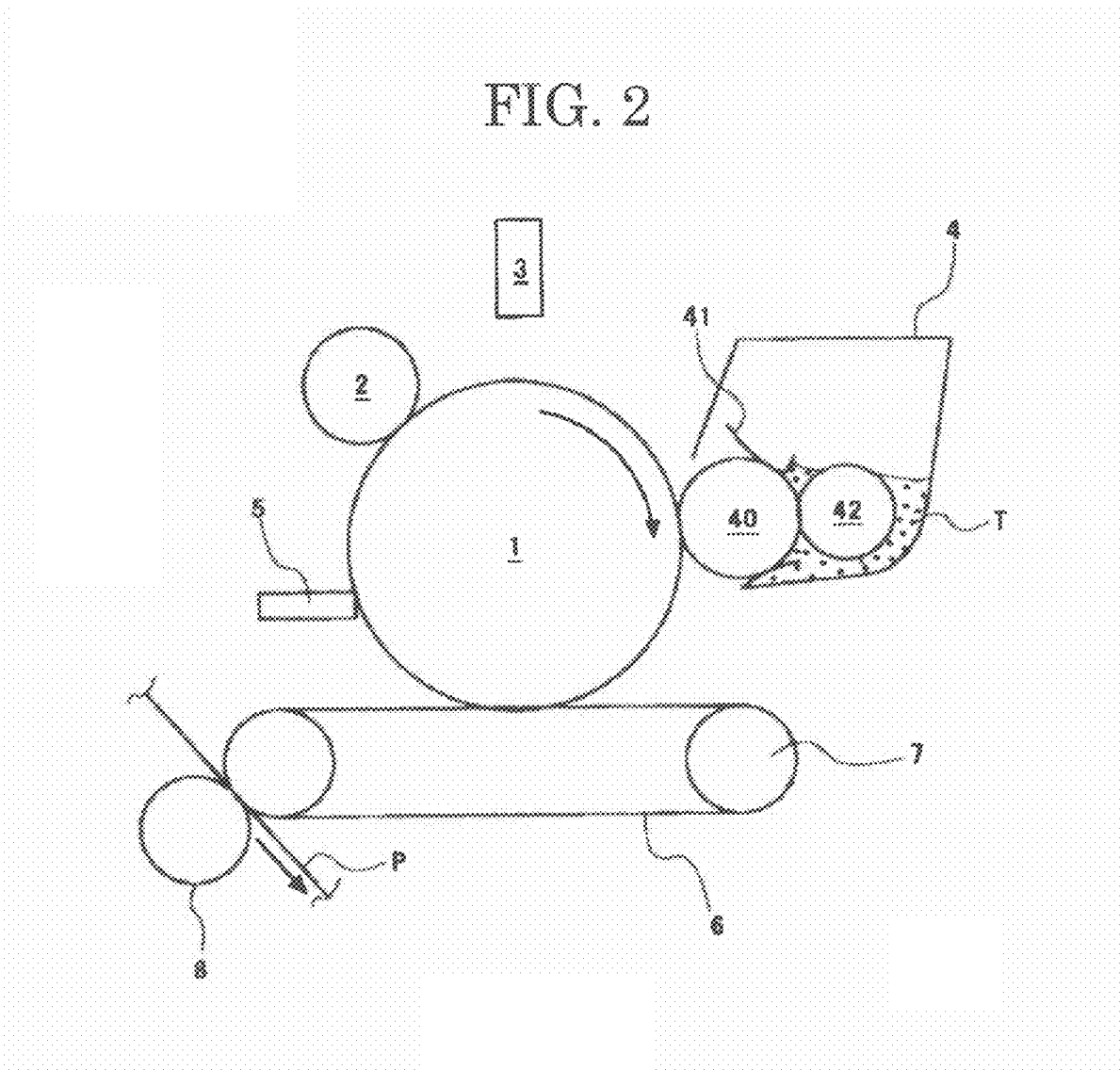
FIG. 2 illustrates one exemplary image forming apparatus of the present invention.

FIG. 2 illustrates one exemplary image forming apparatus of the present invention. This image forming apparatus contains, in an unillustrated main body casing, a latent image bearing member (1) rotated clockwise in FIG. 2 which is provided therearound with a charging device (2) which is the charging unit, an exposing device (3) which is the exposing unit, a developing device (4) which is the developing unit having the electrostatic image developing toner (T) of the present invention, a cleaning part (5), an intermediate transfer medium (6), a supporting roller (7), a transfer roller (8), an unillustrated charge-eliminating unit, and other members.

This image forming apparatus has an unillustrated paper-feeding cassette containing a plurality of recording paper sheets (P), which are the image-receiving media. The recording paper sheets (P) in the paper-feeding cassette are fed one by one with an unillustrated paper-feeding roller to between the intermediate transfer medium (6) and the transfer roller (8) serving as a transfer unit. Before fed to therebetween, the recording paper sheet is retained with a pair of registration rollers so that it can be fed at a desired timing.

In this image forming apparatus, while being rotated clockwise in FIG. 2, the latent image bearing member (1) is uniformly charged with the charging device (2). Then, the latent image bearing member (1) is irradiated with laser beams modulated by image date from the exposing device (3), to thereby form a latent electrostatic image. The latent electrostatic image formed on the latent image bearing member (1) is developed with the toner using the developing device (4). Next, the toner image formed with the developing device (4) is transferred from the latent image bearing member (1) to the intermediate transfer medium (6) through application of transfer bias. Separately, the recording paper sheet (P) is fed to between the intermediate transfer medium (6) and the transfer roller (8), whereby the toner image is transferred onto the recording paper sheet (P). Moreover, the recording paper sheet (P) with the toner image is conveyed to an unillustrated fixing unit.

The fixing unit has a fixing roller and a press roller, wherein the fixing roller is heated to a predetermined temperature and the press roller is pressed against the fixing roller at a predetermined pressure. The fixing unit heats and presses the recording paper sheet conveyed from the transfer roller (8), to thereby fix the toner image on the recording paper sheet, which is then discharged to an unillustrated discharge tray.

In the image forming apparatus after the above-described recording process, the latent image bearing member (1), from which the toner image has been transferred by the transfer roller (8) onto the recording paper sheet, is further rotated to reach the cleaning part (5), where the toner remaining on the surface of the latent image bearing member (1) is scraped off. Then, the latent image bearing member (1) is charge-eliminated with an unillustrated charge-eliminating device. The image forming apparatus uniformly charges, with the charging device (2), the latent image bearing member (1) which has been charge-eliminated by the charge-eliminating device, and performs the next image formation in the same manner as described above.

Next will be described in detail the members suitably used in the image forming apparatus of the present invention.

The material, shape, structure and size of the latent image bearing member (1) are not particularly limited and may be appropriately selected from those know in the art. The latent image bearing member is suitably in the form of a drum or belt, and is, for example, an inorganic photoconductor made of, for example, amorphous silicon or selenium and an organic photoconductor made of, for example, polysilane or phthalopolymethine. Of these, an amorphous silicon photoconductor or an organic photoconductor is preferred since it has a long service life.

The latent electrostatic image can be formed on the latent image bearing member (1) with a latent electrostatic image-forming unit by, for example, imagewise exposing the charged surface of the latent image bearing member (1). The latent electrostatic image-forming unit contains at least the charging device (2) which charges the surface of the latent image bearing member (1) and the exposing device (3) which imagewise exposes the surface of the latent image bearing member (1).

The charging step can be performed by, for example, applying a voltage to the surface of the latent image bearing member (1) using the charging device (2).

The charging device (2) is not particularly limited and may be appropriately selected depending on the intended purpose. Examples thereof include contact-type chargers known per se having, for example, a conductive or semiconductive roller, a brush, a film and a rubber blade; and non-contact-type chargers utilizing colona discharge such as corotron and scorotron.

The charging device (2) may be a charging roller as well as a magnetic brush or a fur brush. The shape thereof may be suitably selected according to the specification or configuration of an electrophotographic apparatus. When a magnetic brush is used as the charging device, the magnetic brush is composed of a charging member of various ferrite particles such as Zn—Cu ferrite, a non-magnetic conductive sleeve to support the ferrite particles, and a magnetic roller included in the non-magnetic conductive sleeve. Also, the fur brush is, for example, a fur treated to be conductive with, for example, carbon, copper sulfide, a metal or a metal oxide, and the fur is coiled or mounted to a metal or a metal core which is treated to be conductive, thereby obtaining the charging device.

The charging device (2) is not limited to the aforementioned contact-type chargers. However, the contact-type chargers are preferably used from the viewpoint of reducing the amount of ozone generated from the charger in the image forming apparatus.

The exposing can be performed by, for example, imagewise exposing the photoconductor surface with the exposing device (3). The exposing device (3) is not particularly limited and may be appropriately selected depending on the intended purpose, so long as it attains desired imagewise exposure to the surface of the latent image bearing member (1) charged with the charging device (2). Examples thereof include various exposing devices such as a copy optical exposing device, a rod lens array exposing device, a laser optical exposing device and a liquid crystal shutter exposing device.

The developing can be performed by, for example, developing the latent electrostatic image with the toner of the present invention using the developing device (4). The developing device (4) is not particularly limited, so long as it attains development using the toner of the present invention, and may be appropriately selected from known developing units. Preferred examples of the developing units include those having a developing device which has the toner of the present invention therein and which can apply the toner to the latent electrostatic image in a contact or non-contact manner.

The developing device (4) preferably has a developing roller (40) and a thin layer-forming member (41). Here, the developing roller (40) has a toner on the circumferential surface thereof and supplies the toner to the latent electrostatic image formed on the latent image bearing member (1) while being rotated together with the latent image bearing member (1) the developing roller (40) is in contact with. The thin layer-forming member (41) comes into contact with the circumferential surface of the developing roller (40) to form a thin layer of the toner on the developing roller (40).

The developing roller (40) used is preferably a metal roller or elastic roller. The metal roller is not particularly limited and may be appropriately selected depending on the intended purpose. Examples thereof include an aluminum roller. By treating the metal roller through blast treatment, the developing roller (40) having a desired surface friction coefficient can be formed relatively easily. Specifically, an aluminum roller can be treated through glass bead blasting to roughen the roller surface. The thus-obtained developing roller can attach an appropriate amount of toner thereonto.

The elastic roller used is a roller coated with an elastic rubber layer. The roller is further provided thereon with a surface coat layer made of a material that is easily chargeable at the opposite polarity to that of the toner. The hardness of the elastic rubber layer is set to be equal to or lower than 60° according to JIS-A, in order to prevent the toner from being degraded due to pressure concentration at a contact region between the elastic rubber layer and the thin layer-forming member (41). The surface roughness (Ra) of the elastic rubber layer is set to be 0.3 µm to 2.0 µm so as to retain, on its surface, the toner in a necessary amount. Also, since the developing roller (40) receives a developing bias for forming an electrical field between the developing roller (40) and the latent image bearing member (1), the resistance of the elastic rubber layer is set to be $10^3\Omega$ to $10^{10}\Omega$. The developing roller (40) is rotated counterclockwise to convey the toner retained thereon to positions where the developing roller (40) faces the thin layer forming member (41) and the latent image bearing member (1).

The thin layer-forming member (41) is provided upstream of the contact region between the supply roller (42) and the developing roller (40) in a direction in which the developing roller (40) is rotated. The thin layer-forming member (41) is a metal plate spring of stainless steel (SUS) or phosphor bronze, and its free end is brought into contact with the surface of the developing roller (40) at a press force of 10 N/m to 40 N/m. The thin layer-forming member (41) forms the toner passing thereunder into a thin layer by the press force and frictionally charges the toner. In addition, for aiding frictional charging, the thin layer forming member (41) receives a regulation bias having a value offset in the same direction of the polarity of the toner against the developing bias.

The rubber elastic material forming the surface of the developing roller (40) is not particularly limited and may be appropriately selected depending on the intended purpose. Examples thereof include styrene-butadiene copolymer rubbers, butadiene copolymer rubbers, acrylonitrile-butadiene copolymer rubbers, acrylic rubbers, epichlorohydrin rubbers, urethane rubbers, silicone rubbers and blends of two or more of them. Of these, particularly preferred are blend rubbers of epichlorohydrin rubbers and acrylonitrile-butadiene copolymer rubbers.

The developing roller (40) is produced by, for example, coating the circumference of a conductive shaft with the rubber elastic material. The conductive shaft is made, for example, of a metal such as stainless steel (SUS).

The transfer can be performed by, for example, charging the latent image bearing member (1) with a transfer roller. The transfer roller preferably has a primary transfer unit configured to transfer the toner image onto the intermediate transfer medium (6) to form a transfer image; and a secondary transfer unit (transfer roller (8)) configured to transfer the transfer image onto a recording paper sheet (P). More preferably, in response to the case where toners of two or more colors, preferably, full color toners are used, the transfer roller has a primary transfer unit configured to transfer the toner images onto the intermediate transfer medium (6) to form a composite transfer image; and a secondary transfer unit configured to transfer the composite transfer image onto a recording paper sheet (P).

Notably, the intermediate transfer medium (6) is not particularly limited and may be appropriately selected from known transfer media. Preferred examples thereof include a transfer belt.

The transfer unit (the primary transfer unit or the secondary transfer unit) preferably has at least a transfer device which charge-separates the toner image from the latent image bearing member (1) toward the recording paper sheet (P). The number of the transfer unit may be one or more. Examples of the transfer unit include a corona transfer device using colona discharge, a transfer belt, a transfer roller, a pressure transfer roller and an adhesive transfer device.

Notably, typical examples of the recording paper sheet (P) include plain paper. The recording paper sheet, however, is not particularly limited and may be appropriately selected depending on the intended purpose, so long as it can receive an unfixed image formed after development. Further examples of the recording paper sheet employable include PET bases for use in OHP.

The fixing can be performed by, for example, fixing the toner image transferred onto the recording paper sheet (P) with a fixing unit. The fixing of the toner images of colors may be performed every time when each toner image is transferred onto the recording paper sheet (P) or at one time after the toner images of colors have been mutually superposed.

The fixing unit is not particularly limited and may be appropriately selected depending on the intended purpose. The fixing unit is preferably a known heat-press unit. Examples of the heat-press unit include a combination of a heating roller and a pressing roller and a combination of a heating roller, a pressing roller and an endless belt. Notably, the heating temperature of the heat-press unit is preferably 80° C. to 200° C.

Figure 3:
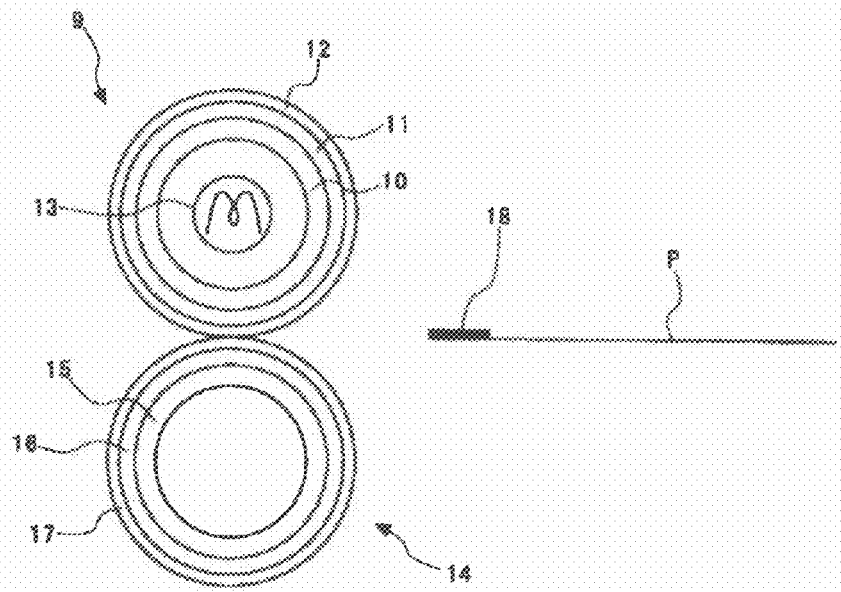
FIG. 3 illustrates one exemplary fixing device used in an image forming apparatus of the present invention.

The fixing device may be a soft roller-type fixing device having fluorine-containing surface layers as illustrated in FIG. 3. This fixing unit has a heat roller (9) and a press roller (14). The heat roller (9) has an aluminum core (10), an elastic material layer (11) of silicone rubber, PFA (tetrafluoroethylene-perfluoroalkyl vinyl ether copolymer) surface layer (12) and a heater (13), where the elastic material layer (11) and the PFA surface layer (12) are provided on the aluminum core (10) and the heater (13) is provided inside the aluminum core (10). The press roller (14) has an aluminum core (15), an elastic material layer (16) of silicone rubber and a PFA surface layer (17), where the elastic material layer (16) and the PFA surface layer (17) are provided on the aluminum core (15). Notably, the recording paper sheet (P) having an unfixed image (18) is fed as illustrated.

Notably, in the present invention, a known optical fixing device may be used in addition to or instead of the fixing unit depending on the intended purpose.

Charge elimination is preferably performed by, for example, applying a charge-eliminating bias to the latent image bearing member with a charge-eliminating unit. The charge-eliminating unit is not particularly limited, so long as it can apply a charge-eliminating bias to the latent image bearing member, and may be appropriately selected from known charge-eliminating devices. Preferably, a charge-eliminating lamp or a similar device is used.

Cleaning is preferably performed by, for example, removing the toner remaining on the photoconductor with a cleaning unit. The cleaning unit is not particularly limited, so long as it can remove the toner remaining on the photoconductor, and may be appropriately selected from known cleaners. Preferred examples thereof include a magnetic blush cleaner, an electrostatic brush cleaner, a magnetic roller cleaner, a blade cleaner, a brush cleaner and a web cleaner.

Recycling is preferably performed by, for example, conveying the toner having been removed by the cleaning unit to the developing unit with a recycling unit. The recycling unit is not particularly limited and may be, for example, a known conveying unit.

Control is preferably performed by, for example, controlling each unit with a controlling unit. The controlling unit is not particularly limited, so long as it can control each unit, and may be appropriately selected depending on the intended purpose. Examples thereof include devices such as a sequencer and a computer.

The image forming apparatus, image forming method or process cartridge of the present invention uses the latent electrostatic image developing toner excellent in fixing property and involving no degradation (e.g., cracks) due to stress in the developing process, and thus can provide good images.

<Multi-Color Image Forming Apparatus>

Figure 4:
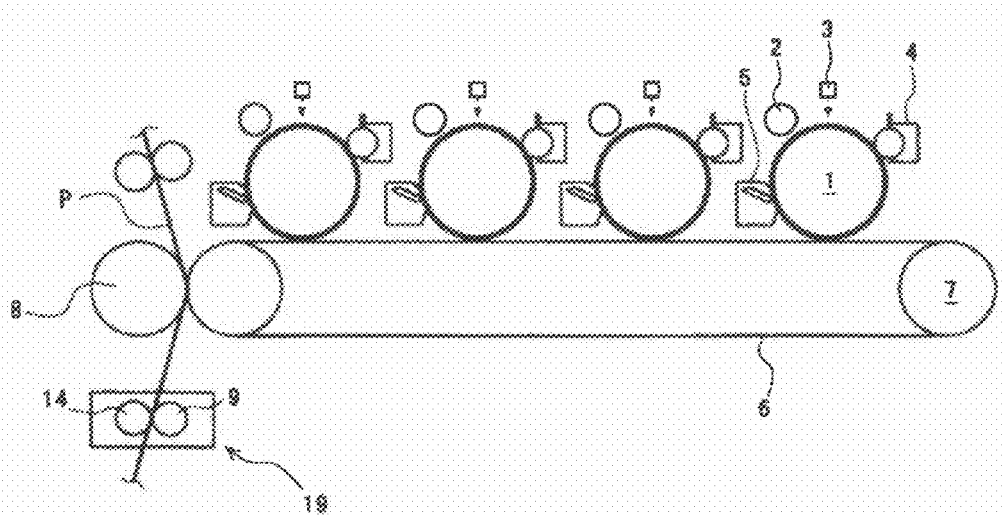
FIG. 4 is a schematic view of an example of a multi-color image forming apparatus to which the present invention is applied.

FIG. 4 is a schematic view of an example of a multi-color image forming apparatus to which the present invention is applied. The multi-color image forming apparatus illustrated in FIG. 4 is a tandem-type full color image forming apparatus.

The image forming apparatus of FIG. 4 contains, in an unillustrated main body casing, latent image bearing members (1) rotated clockwise in FIG. 4 which are each provided therearound with a charging device (2), an exposing device (3), a developing device (4), an intermediate transfer medium (6), a supporting roller (7), a transfer roller (8), and other members. This image forming apparatus has an unillustrated paper-feeding cassette containing a plurality of recording paper sheets. The recording paper sheets (P) in the paper-feeding cassette are fed one by one with an unillustrated paper-feeding roller to between the intermediate transfer medium (6) and the transfer roller (8), followed by fixing with a fixing unit (19). Before fed to therebetween, the recording paper sheet is retained with a pair of registration rollers so that it can be fed at a desired timing. This fixing unit has a heat roller (9) and a press roller (14).

In this image forming apparatus, while being rotated clockwise in FIG. 4, each of the latent image bearing members (1) is uniformly charged with the corresponding charging device (2). Then, the latent image bearing member (1) is irradiated with laser beams modulated by image date from the corresponding exposing device (3), to thereby form a latent electrostatic image. The latent electrostatic image formed on the latent image bearing member (1) is developed with the toner using the corresponding developing device (4). Next, the toner image, which has formed by applying the toner to the latent image bearing member with the developing device (4), is transferred from the latent image bearing member (1) to the intermediate transfer medium. The above-described process is performed in four colors of cyan (C), magenta (M), yellow (Y) and black (K), to thereby form a full color toner image.

Figure 5:
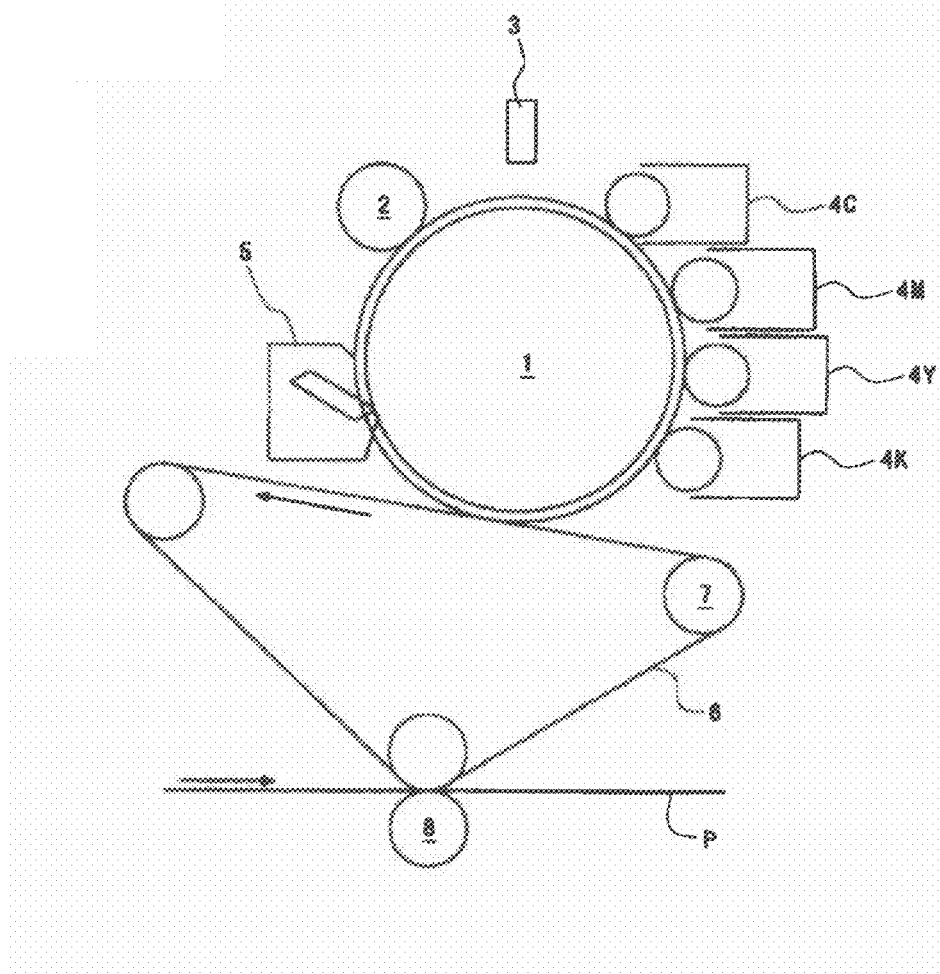
FIG. 5 is a schematic view of an example of a full color image forming apparatus of a revolver type.

FIG. 5 is a schematic view of an example of a full color image forming apparatus of a revolver type. This image forming apparatus switches the operation of each developing device to sequentially apply color toners onto one latent image bearing member (1) for development. A transfer roller (8) is used to transfer the color toner image from the intermediate transfer medium (6) onto a recording paper sheet (P), which is then conveyed to a fixing part for obtaining a fixed image. The intermediate transfer member (6) is supported on the supporting roller (7). The developing device include a cyan developing device (4C), a magenta developing device (4M), a yellow developing device (4Y), and a black developing device (4K).

In the image forming apparatus after the toner image has been transferred from the intermediate transfer member (6)

onto the recording paper sheet (P), the latent image bearing member (1) is further rotated to reach a cleaning part (5) where the toner remaining on the surface of the latent image bearing member (1) is scraped off by a blade, followed by charge-eliminating. Then, the image forming apparatus uniformly charges, with the charging device (2), the latent image bearing member (1) charge-eliminated by the charge-eliminating device, and performs the next image formation in the same manner as described above. Notably, the cleaning part (5) is limited to the part where the toner remaining on the latent image bearing member (1) is scraped off by a blade. For example, the cleaning part (5) may be a part where the toner remaining on the latent image bearing member (1) is scraped off by a fur brush.

The image forming method or image forming apparatus of the present invention uses as a developer the toner of the present invention, and thus can provide good images.

<Process Cartridge>

One exemplary process cartridge of the present invention now will be explained.

The developing unit has at least a developer container housing the toner or the developer of the present invention, and a developer bearing member which bears and conveys the toner or the developer housed in the developer container; and optionally includes, for example, a layer thickness-regulating member for regulating the layer thickness of the toner on the developer bearing member. The process cartridge of the present invention can be mounted detachably to various electrophotographic apparatuses, facsimiles and printers. Preferably, it is mounted detachably to the image forming apparatus of the present invention.

Figure 6:
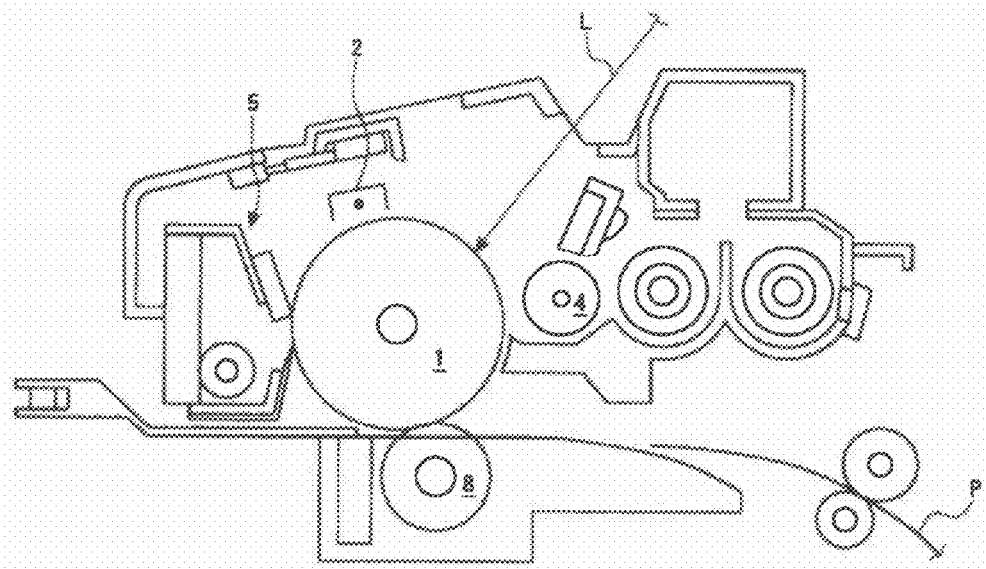
FIG. 6 illustrates one exemplary process cartridge of the present invention.

As illustrated in FIG. 6, the process cartridge includes a latent image bearing member (1), a charging device (2), a developing device (4), a transfer roller (8) and a cleaning part (5); and, if necessary, further includes other units. In FIG. 6, (L) denotes light emitted from an unillustrated exposing device and (P) denotes a recording paper sheet. The latent image bearing member (1) may be the same as that used in the above-described image forming apparatus. The charging device (2) may be any charging member.

Next, description will be given to image forming process by the process cartridge illustrated in FIG. 6. While being rotated clockwise, the latent image bearing member (1) is charged with the charging device (2) and then is exposed to light (L) emitted from the unillustrated exposing unit. As a result, a latent electrostatic image in response to an exposure pattern is formed on the surface of the latent image bearing member (1). The latent electrostatic image is developed with the toner in the developing device (4). The developed toner image is transferred with the transfer roller (8) onto the recording paper sheet (P), which is then printed out. Next, the latent image bearing member surface from which the toner image has been transferred is cleaned in the cleaning part (5), and is charge-eliminated with an unillustrated charge-eliminating unit. The above-described process is repeatedly performed.

EXAMPLES

The present invention will next be described by way of Examples, which should not be construed as limiting the present invention thereto. In the following Examples, the unit "part(s)" is part(s) by mass and the unit "%" is % by mass.

<Preparation Method of Resin Dispersion Liquid 1>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.6 parts) in ion-exchange water (104 parts) was added to the resultant solution. Fifteen minutes after the addition, a monomer mixture of a styrene monomer (200 parts) and n-octanethiol (4.2 parts) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 1] having a volume average particle diameter of 135 nm. Subsequently, 2 mL of the thus-obtained [resin dispersion liquid 1] was added to a Petri dish, where the dispersion medium was evaporated. The obtained dry product was measured for number average molecular weight, weight average molecular weight and Tg, which were found to be 8,300, 16,900 and 83° C., respectively.

<Preparation Method of Resin Dispersion Liquid 2>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.6 parts) in ion-exchange water (104 parts) was added to the resultant solution. Fifteen minutes after the addition, a monomer mixture of a styrene monomer (170 parts), butyl acrylate (30 parts) and n-octanethiol (4.2 parts) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 2] having a volume average particle diameter of 135 nm. Subsequently, 2 mL of the thus-obtained [resin dispersion liquid 2] was added to a Petri dish, where the dispersion medium was evaporated. The obtained dry product was measured for number average molecular weight, weight average molecular weight and Tg, which were found to be 8,600, 17,300 and 55° C., respectively.

<Preparation Method of Resin Dispersion Liquid 3>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.7 parts) in ion-exchange water (108 parts) was added to the resultant solution. Fifteen minutes after the addition, a monomer mixture of a styrene monomer (196 parts), methacrylic acid (4 parts), and n-octanethiol (4.2 parts) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 3] having a volume average particle diameter of 117 nm. Subsequently, 2 mL of the thus-obtained [resin dispersion liquid 3] was added to a Petri dish, where the dispersion medium was evaporated. The obtained dry product was measured for number average molecular weight, weight average molecular weight and Tg, which were found to be 8,900, 31,000 and 61° C., respectively.

<Preparation of Resin Dispersion Liquid 4>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.5 parts) in ion-exchange water (98 parts) was added to the resultant solution. Fifteen minutes after the addition, a monomer mixture of a styrene monomer (160 parts) and [compound 1] having the following chemical formula (40 parts) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 4] having a volume average particle diameter of 115 nm. Subsequently, 2 mL of the thus-obtained [resin dispersion liquid 4] was added to a Petri dish, where the dispersion medium was evaporated. The obtained dry product was measured for number average molecular weight, weight average molecular weight and Tg, which were found to be 98,400, 421,900 and 70° C., respectively.

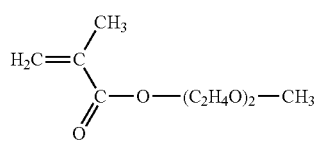

compound 1

<Preparation Method of Resin Dispersion Liquid 5>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.7 parts) in ion-exchange water (108 parts) was added to the resultant solution. Fifteen minutes after the addition, a monomer mixture of a styrene monomer (160 parts) and methyl methacrylate (40 parts) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 5] having a volume average particle diameter of 100 nm. Subsequently, 2 mL of the thus-obtained [resin dispersion liquid 5] was added to a Petri dish, where the dispersion medium was evaporated. The obtained dry product was measured for number average molecular weight, weight average molecular weight and Tg, which were found to be 60,000, 215,500 and 99° C., respectively.

<Preparation Method of Resin Dispersion Liquid 6>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.5 parts) in ion-exchange water (101 parts) was added to the resultant solution. Fifteen minutes after the addition, a monomer mixture of a styrene monomer (170 parts) and butyl acrylate (30 parts) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 6] having a volume average particle diameter of 113 nm. Subsequently, 2 mL of the thus-obtained [resin dispersion liquid 6] was added to a Petri dish, where the dispersion medium was evaporated. The obtained dry product was measured for number average molecular weight, weight average molecular weight and Tg, which were found to be 68,700, 317,600 and 75° C., respectively.

<Preparation Method of Resin Dispersion Liquid 7>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.6 parts) in ion-exchange water (102 parts) was added to the resultant solution. Fifteen minutes after the addition, a monomer mixture of a styrene monomer (184.6 parts), butyl acrylate (15 parts) and divinyl benzene (0.5 parts) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 7] having a volume average particle diameter of 79 nm. Subsequently, 2 mL of the thus-obtained [resin dispersion liquid 7] was added to a Petri dish, where the dispersion medium was evaporated. The obtained dry product was measured for number average molecular weight, weight average molecular weight and Tg, which were found to be 33,900, 160,800 and 87° C., respectively.

<Preparation Method of Resin Dispersion Liquid 8>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.5 parts) in ion-exchange water (101 parts) was added to the resultant solution. Fifteen minutes after the addition, a monomer mixture of a styrene monomer (169 parts), butyl acrylate (30 parts) and divinyl benzene (1 part) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 8] having a volume average particle diameter of 100 nm. Subsequently, 2 mL of the thus-obtained [resin dispersion liquid 8] was added to a Petri dish, where the dispersion medium was evaporated. The obtained dry product was measured for number average molecular weight, weight average molecular weight and Tg, which were found to be 31,300, 88,300 and 75° C., respectively.

<Preparation Method of Resin Dispersion Liquid 9>

A polyester resin dispersion liquid RTP-2 (product of TOYOBO CO., LTD.) was used as [resin dispersion liquid 9].

<Preparation Method of Resin Dispersion Liquid 10>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.5 parts) in ion-exchange water (98 parts) was added to the resultant solution. Fifteen minutes after the addition, a monomer mixture of a styrene monomer (130 parts) and the [compound 1] (70 parts) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 10] having a volume average particle diameter of 115 nm. Subsequently, 2 mL of the thus-obtained [resin dispersion liquid 10] was added to a Petri dish, where the dispersion medium was evaporated. The obtained dry product was measured for number average molecular weight, weight average molecular weight and Tg, which were found to be 87,600, 391,700 and 48° C., respectively.

<Preparation Method of Resin Dispersion Liquid 11>

A reaction container equipped with a condenser, a stirrer and a nitrogen-introducing pipe was charged with sodium lauryl sulfate (0.7 parts) and ion-exchange water (498 parts), followed by heating to 80° C. under heating for dissolution. Then, a solution of potassium persulfate (2.8 parts) in ion-exchange water (111 parts) was added to the resultant solution. Fifteen minutes after the addition, a monomer mixture of a styrene monomer (130 parts) and methyl methacrylate (70 parts) was added dropwise to the resultant mixture for 90 min. Subsequently, the temperature of the mixture was maintained at 80° C. for 60 min to perform polymerization reaction.

Then, the reaction mixture was cooled to obtain white [resin dispersion liquid 11] having a volume average particle diameter of 122 nm. Subsequently, 2 mL of the thus-obtained [resin dispersion liquid 11] was added to a Petri dish, where the dispersion medium was evaporated. The obtained dry product was measured for number average molecular weight, weight average molecular weight and Tg, which were found to be 61,900, 183,500 and 99° C., respectively.

[Production Method of Polymerized Toner]

<Synthesis of Polyester 1>

A reaction container equipped with a condenser, a stirrer and a nitrogen-introducing pipe was charged with bisphenol A ethylene oxide 2 mol adduct (229 parts), bisphenol A propylene oxide 3 mol adduct (529 parts), terephthalic acid (208 parts), adipic acid (46 parts) and dibutyl tinoxide (2 parts), followed by reaction at 230° C. for 8 hours under normal pressure. Next, the reaction mixture was allowed to react for 5 hours under a reduced pressure of 10 mmHg to 15 mmHg. Then, trimellitic anhydride (44 parts) was added to the reaction container, followed by reaction at 180° C. for 2 hours under normal pressure, to thereby synthesize [polyester 1]. The thus-obtained [polyester 1] was found to have a number average molecular weight of 2,500, a weight average molecular weight of 6,700, a glass transition temperature of 43° C. and an acid value of 25 mgKOH/g.

<Synthesis of Polyester 2>

A reaction container equipped with a condenser, a stirrer and a nitrogen-introducing pipe was charged with bisphenol A ethylene oxide 2 mol adduct (264 parts), bisphenol A propylene oxide 2 mol adduct (523 parts), terephthalic acid (123 parts), adipic acid (173 parts) and dibutyl tinoxide (1 part), followed by reaction at 230° C. for 8 hours under normal pressure. Next, the reaction mixture was allowed to react for 8 hours under a reduced pressure of 10 mmHg to 15 mmHg. Then, trimellitic anhydride (26 parts) was added to the reaction container, followed by reaction at 180° C. for 2 hours under normal pressure, to thereby synthesize [polyester 2]. The thus-obtained [polyester 2] was found to have a number average molecular weight of 4,000, a weight average molecular weight of 47,000, a glass transition temperature of 65° C. and an acid value of 12 mgKOH/g.

<Synthesis of Isocyanate-Modified Polyester 1>

A reaction container equipped with a condenser, a stirrer and a nitrogen-introducing pipe was charged with bisphenol A ethylene oxide 2 mol adduct (682 parts), bisphenol A propylene oxide 2 mol adduct (81 parts), terephthalic acid (283 parts), trimillitic anhydride (22 parts) and dibutyl tinoxide (2 parts), followed by reaction at 230° C. for 8 hours under normal pressure. Next, the reaction mixture was allowed to react for 5 hours under a reduced pressure of 10 mmHg to 15 mmHg, to thereby synthesize [intermediate polyester 1]. The thus-obtained [intermediate polyester 1] was found to have a number average molecular weight of 2,200, a weight average molecular weight of 9,700, a glass transition temperature of 54° C., an acid value of 0.5 mgKOH/g and a hydroxyl value of 52 mgKOH/g.

Next, a reaction container equipped with a condenser, a stirrer and a nitrogen-introducing pipe was charged with [intermediate polyester 1] (410 parts), isophorone diisocyanate (89 parts) and ethyl acetate (500 parts), followed by reaction at 100° C. for 5 hours, to thereby obtain [isocyanate-modified polyester 1].

<Preparation of Masterbatch>

Carbon black (REGAL 400R, product of Cabot Corporation) (40 parts), a binder resin (polyester resin) (60 parts) (RS-801, product of Sanyo Chemical Industries, Ltd., acid value: 10, Mw: 20,000, Tg: 64° C.) and water (30 parts) were mixed together using HENSCHEL MIXER, to thereby obtain a mixture containing pigment aggregates impregnated with water. The obtained mixture was kneaded for 45 min with a two-roll mill whose roll surface temperature had been adjusted to 130° C. The kneaded product was pulverized with a pulverizer so as to have a size of 1 mm, whereby [masterbatch 1] was obtained.

Example 1

<Preparation Step of Oil Phase>

A container to which a stirring rod and a thermometer had been set was charged with [polyester 1] (545 parts), [paraffin wax (melting point: 74° C.)] (181 parts) and ethyl acetate (1,450 parts). The mixture was increased in temperature to 80° C. under stirring, maintained at 80° C. for 5 hours, and cooled to 30° C. for 1 hour. Then, the container was charged with [masterbatch 1] (500 parts) and ethyl acetate (100 parts), followed by mixing for 1 hour, to thereby obtain [raw material solution 1].

[Raw material solution 1] (1,500 parts) was placed in a container, where the pigment and the wax were dispersed with a bead mill ("ULTRA VISCOMILL," product of AIMEX CO., Ltd.) under the following conditions: a liquid feed rate of 1 kg/hr, disc circumferential velocity of 6 m/s, 0.5 mm-zirconia beads packed to 80% by volume, and 3 passes. Next, a 66% by mass ethyl acetate solution of [polyester 2] (655 parts) was added thereto, and passed once with the bead mill under the above conditions, to thereby obtain [pigment/wax dispersion liquid 1].

[Pigment/wax dispersion liquid 1] (976 parts) was mixed for 1 min at 5,000 rpm with a TK homomixer (product of Tokushu Kika Kogyo Co., Ltd.). Then, [isocyanate-modified polyester 1] (88 parts) was added to the [pigment/wax dispersion liquid 1]. The resultant mixture was mixed for 1 min at 5,000 rpm with a TK homomixer (product of Tokushu Kika Kogyo Co., Ltd.), to thereby obtain [oil phase 1]. Through measurement, the solid content of [oil phase 1] was found to be 52.0% by mass, and the amount of ethyl acetate in the solid content was found to be 92% by mass.

<Preparation of Aqueous Phase>

Ion-exchange water (970 parts), 40 parts of 25% aqueous dispersion liquid of fine organic resin particles for stabilizing dispersion (a copolymer of styrene-methacrylic acid-butyl acrylate-sodium salt of methacrylic acid ethylene oxide adduct sulfuric acid ester), 95 parts of 48.5% aqueous solution of sodium dodecyl diphenyl ether disulfonate and 98 parts of ethyl acetate were mixed together under stirring. The resultant mixture was found to have a pH of 6.2. Then, 10% aqueous solution of sodium hydroxide was added dropwise thereto to adjust the pH to 9.5, whereby [aqueous phase 1] was obtained.

<Production Step of Core Particles>

The obtained [aqueous phase 1] (1,200 parts) was added to [oil phase 1]. The resultant mixture was mixed for 2 min with a TK homomixer at 8,000 rpm to 15,000 rpm, while being adjusted to 20° C. to 23° C. in a water bath to suppress increase in temperature due to shear heat of the mixer. Thereafter, the mixture was stirred for 10 min at 130 rpm to 350 rpm using a three-one motor equipped with an anchor wing, to thereby obtain [core particle slurry 1] (toner core particle slurry) containing liquid droplets of the oil phase (core particles) in the aqueous phase.

<Formation of Protrusions>

First, [resin dispersion liquid 1] (106 parts) was mixed with ion-exchange water (71 parts). The resultant mixture (solid concentration: 15%) was added dropwise for 3 min to [core particle slurry 1] whose temperature was adjusted to 22° C. This addition was performed while [core particle slurry 1] was being stirred at 130 rpm to 350 rpm with a three-one motor equipped with an anchor wing. Thereafter, the mixture was further stirred for 30 min at 200 rpm to 450 rpm to obtain [composite particle slurry 1]. Then, 1 mL of [composite particle slurry 1] was diluted so as to have a volume of 10 mL, followed by centrifugation, whereby a transparent supernatant was obtained.

<Desolvation>

A container to which a stirrer and a thermometer had been set was charged with [composite particle slurry 1], which was desolvated with stirring at 30° C. for 8 hours to obtain [dispersion slurry 1]. A small amount of [dispersion slurry 1] was placed on a glass slide, and observed through a cover glass under an optical microscope (×200). As a result, uniform colored particles were observed. Also, 1 mL of [dispersion slurry 1] was diluted so as to have a volume of 10 mL, followed by centrifugation, whereby a transparent supernatant was obtained.

<Washing/Drying Step>

After [dispersion slurry 1] (100 parts) had been filtrated under reduced pressure, the following treatments (1) to (4) were performed.

(1) Ion-exchange water (100 parts) was added to the filtration cake, followed by mixing with a TK homomixer (at 12,000 rpm for 10 min) and filtrating.
(2) Ion-exchange water (900 parts) was added to the filtration cake obtained in (1). The resultant mixture was mixed with a TK homomixer (at 12,000 rpm for 30 min) under application of ultrasonic vibration, followed by filtrating under reduced pressure. This treatment was repeated until the reslurry had an electrical conductivity of 10 µC/cm or lower.
(3) 10% hydrochloric acid was added to the reslurry obtained in (2) so as to have a pH of 4, followed by stirring for 30 min with a three-one motor and filtrating.
(4) Ion-exchange water (100 parts) was added to the filtration cake obtained in (3), followed by mixing with a TK homomixer (at 12,000 rpm for 10 min) and filtrating. This treatment was repeated until the reslurry had an electrical conductivity of 10 µC/cm or lower, to thereby obtain [filtration cake 1].

[Filtration cake 1] was dried with an air-circulation dryer at 45° C. for 48 hours, and then sieved with a mesh having an opening size of 75 µm to obtain [toner base 1] (toner particles). Through observation of the obtained [toner base 1] under a scanning electron microscope, the vinyl resin was found to be uniformly attached to the surfaces of the toner core particles.

<Addition Step of External Additives>

[Toner base 1] (100 parts), and commercially available silica fine powder RX200 (1.5 parts) (product of Nippon Aerosil Co., Ltd.; average primary particle diameter: 12 nm), RX50 (2.8 parts) (product of Nippon Aerosil Co., Ltd.; average primary particle diameter: 40 nm) and MSP-009 (0.8 parts) (product of Tayca Corporation; average primary particle diameter: 80 nm) were mixed together using HENSCHEL MIXER. The resultant mixture was caused to pass through a sieve with an opening size of 60 µM to remove coarse particles and aggregates, whereby [toner 1] was obtained.

FIG. 1A is an SEM image of the [toner 1].

Example 2

[Toner 2] was obtained in the same manner as in Example 1, except that the amount of the MSP-009 was changed from 0.8 parts to 1.6 parts in the addition of the external additives.

Example 3

[Toner 3] was obtained in the same manner as in Example 1, except that the amount of the MSP-009 was changed from 0.8 parts to 0.2 parts in the addition of the external additives.

Example 4

[Toner 4] was obtained in the same manner as in Example 1, except that the MSP-009 was changed to ACP-04 [product of FUJIKURA KASEI CO., LTD.; average primary particle diameter: 250 nm] in the addition of the external additives.

Example 5

[Toner 5] was obtained in the same manner as in Example 1, except that the MSP-009 was changed to ACP-06 [product of FUJIKURA KASEI CO., LTD.; average primary particle diameter: 100 nm] in the addition of the external additives.

Example 6

[Toner 6] was obtained in the same manner as in Example 1, except that the MSP-009 was changed to ACP-07 [product of FUJIKURA KASEI CO., LTD.; average primary particle diameter: 150 nm] in the addition of the external additives.

Example 7

[Toner 7] was obtained in the same manner as in Example 1, except that the MSP-009 was changed to P-2000 [product of Nippon Paint Co., Ltd.; average primary particle diameter: 400 nm] in the addition of the external additives.

Example 8

[Toner 8] was obtained in the same manner as in Example 1, except that the MSP-009 was changed to MP-300 [product of Soken Chemical & Engineering Co., Ltd.; average primary particle diameter: 60 nm] in the addition of the external additives.

Example 9

[Toner 9] was obtained in the same manner as in Example 1, except that the MSP-009 was changed to MP-400 [product of Soken Chemical & Engineering Co., Ltd.; average primary particle diameter: 200 nm] in the addition of the external additives.

Example 10

[Toner 10] was obtained in the same manner as in Example 1, except that the MSP-009 was changed to MP-5500 [prod-

Example 11

[Toner 11] was obtained in the same manner as in Example 1, except that the MSP-009 was changed to T110TSC [product of Fuji Titanium Industry Co., Ltd.; average primary particle diameter: 100 nm] in the addition of the external additives.

Example 12

[Toner 12] was obtained in the same manner as in Example 1, except that the RX200 was changed to RY200 [product of Nippon Aerosil Co., Ltd.; average primary particle diameter: 12 nm] in the addition of the external additives.

Example 13

[Toner 13] was obtained in the same manner as in Example 1, except that the RX50 was changed to RY50 [product of Nippon Aerosil Co., Ltd.; average primary particle diameter: 40 nm] in the addition of the external additives.

Example 14

[Toner 14] was obtained in the same manner as in Example 1, except that the [resin dispersion liquid 1] was changed to [resin dispersion liquid 2]. Through observation of [toner base 14], which had been obtained before the addition of the external additives, under a scanning electron microscope, the vinyl resin was found to be uniformly fused with the surfaces of the toner core particles.

Example 15

[Toner 15] was obtained in the same manner as in Example 1, except that the [resin dispersion liquid 1] was changed to [resin dispersion liquid 3]. Through observation of [toner base 15], which had been obtained before the addition of the external additives, under a scanning electron microscope, the vinyl resin was found to be uniformly fused with the surfaces of the toner core particles.

Example 16

[Toner 16] was obtained in the same manner as in Example 1, except that the [resin dispersion liquid 1] was changed to [resin dispersion liquid 4]. Through observation of [toner base 16], which had been obtained before the addition of the external additives, under a scanning electron microscope, the vinyl resin was found to be uniformly fused with the surfaces of the toner core particles.

Example 17

[Toner 17] was obtained in the same manner as in Example 1, except that the [resin dispersion liquid 1] was changed to [resin dispersion liquid 5]. Through observation of [toner base 17], which had been obtained before the addition of the external additives, under a scanning electron microscope, the vinyl resin was found to be uniformly fused with the surfaces of the toner core particles.

Example 18

[Toner 18] was obtained in the same manner as in Example 1, except that the [resin dispersion liquid 1] was changed to [resin dispersion liquid 6]. Through observation of [toner base 18], which had been obtained before the addition of the external additives, under a scanning electron microscope, the vinyl resin was found to be uniformly fused with the surfaces of the toner core particles.

Example 19

[Toner 19] was obtained in the same manner as in Example 1, except that the [resin dispersion liquid 1] was changed to [resin dispersion liquid 7]. Through observation of [toner base 19], which had been obtained before the addition of the external additives, under a scanning electron microscope, the vinyl resin was found to be uniformly fused with the surfaces of the toner core particles.

Example 20

[Toner 20] was obtained in the same manner as in Example 1, except that the [resin dispersion liquid 1] was changed to [resin dispersion liquid 8]. Through observation of [toner base 20], which had been obtained before the addition of the external additives, under a scanning electron microscope, the vinyl resin was found to be uniformly fused with the surfaces of the toner core particles.

Example 21

[Toner 21] was obtained in the same manner as in Example 1, except that the [isocyanate-modified polyester 1] was not added. Through observation of [toner base 21], which had been obtained before the addition of the external additives, under a scanning electron microscope, the vinyl resin was found to be uniformly fused with the surfaces of the toner core particles.

Comparative Example 1

[Toner 22] was obtained in the same manner as in Example 1, except that the [resin dispersion liquid 1] was not added. Through observation of [toner base 22], which had been obtained before the addition of the external additives, under a scanning electron microscope, the toner core particles were found to have no protrusions on their surfaces. Desired protrusions were not formed on the toner surfaces, since the fine resin particle dispersion liquid necessary for forming the protrusions was not added.

Comparative Example 2

[Toner 23] was obtained in the same manner as in Example 1, except that the [resin dispersion liquid 1] was changed to [resin dispersion liquid 9]. Through observation of [toner base 23], which had been obtained before the addition of the external additives, under a scanning electron microscope, the toner core particles were found to have no protrusions on their surfaces. The toner core particles had so high compatibility with [fine resin particle dispersion liquid 11] that protrusions could not be formed.

Comparative Example 3

[Toner 24] was obtained in the same manner as in Example 1, except that the MSP-009 was changed to UFP-300 [product of DENKI KAGAKU KOGYO KABUSHIKI KAISHA; average primary particle diameter: 120 nm].

Comparative Example 4

[Toner 25] was obtained in the same manner as in Example 1, except that the MSP-009 was changed to MSN-005 [product of Tayca Corporation; average primary particle diameter: 80 nm].

Comparative Example 5

[Toner 26] was obtained in the same manner as in Example 1, except that the RX200, RX50 and MSP-009 were not added.

Comparative Example 6

[Toner 27] was obtained in the same manner as in Example 1, except that the RX200 and RX50 were not added.

Comparative Example 7

[Toner 28] was obtained in the same manner as in Example 1, except that the RX200 was changed to MSP-005 [product of Tayca Corporation; average primary particle diameter: 16 nm].

Comparative Example 8

[Toner 29] was obtained in the same manner as in Example 1, except that the RX200 and MSP-009 were not added.

Comparative Example 9

[Toner 30] was obtained in the same manner as in Example 1, except that the MSP-009 was not added.

Comparative Example 10

[Toner base 31] was obtained in the same manner as in Example 1, except that the amount of [resin dispersion liquid 1] was changed from 106 parts to 530 parts, and that 105 parts of 48.5% aqueous solution of sodium dodecyl diphenyl ether disulfonate was added simultaneously with the addition of [resin dispersion liquid 1] in the <Formation of protrusions>. Through observation of [toner base 31], which had been obtained before the addition of the external additives, under a scanning electron microscope, the vinyl resin was found to be ununiformly attached to/fused with the surfaces of the toner core particles. Although the surfaces of the toner core particles were virtually covered with the fine resin particles, the protrusions became large.

Comparative Example 11

[Toner 32] was obtained in the same manner as in Example 1, except that the amount of the 48.5% aqueous solution of sodium dodecyl diphenyl ether disulfonate in was changed from 95 parts to 200 parts in the <Preparation of aqueous phase>. Through observation of [toner base 32], which had been obtained before the addition of the external additives, under a scanning electron microscope, the vinyl resin was found to be ununiformly attached to/fused with the surfaces of the toner core particles. The toner core particles were stabilized by an excess amount of the surfactant and thus, the fine resin particles were not uniformly embedded in the toner core particles, making the protrusions considerably ununiform.

Comparative Example 12

[Toner 33] was obtained in the same manner as in Example 1, except that [resin dispersion liquid 1] was added to [aqueous phase 1] and <Formation of protrusions> step was not performed. Through observation of [toner base 33], which had been obtained before the addition of the external additives, under a scanning electron microscope, the vinyl resin was found to be ununiformly attached to/fused with the surfaces of the toner core particles. Since the fine resin particles were added before formation of the toner core particles, the fine resin particles embedded in the toner core particles became ununiform, leading to formation of ununiform protrusions.

Figure 1B:
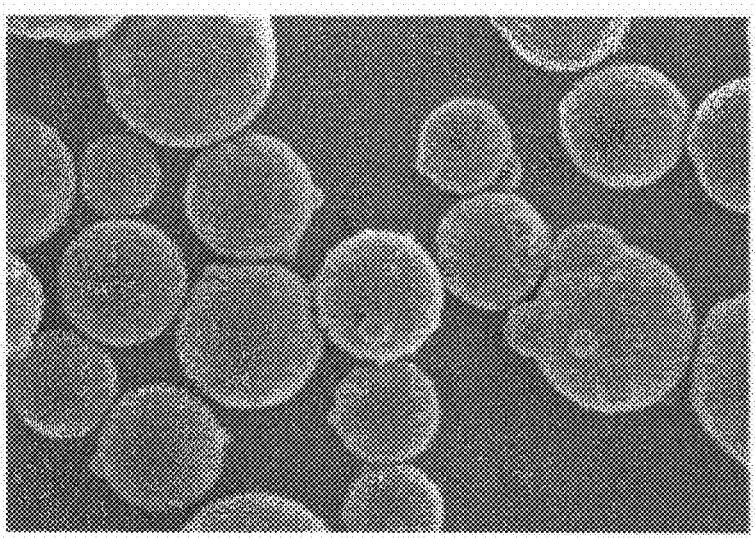
FIG. 1B is an SEM image of the toner of Comparative Example 12.

FIG. 1B is an SEM image of the [toner 33].

Comparative Example 13

[Toner 34] was obtained in the same manner as in Example 1, except that the [resin dispersion liquid 1] was changed to [resin dispersion liquid 10]. Through observation of [toner base 34], which had been obtained before the addition of the external additives, under a scanning electron microscope, the vinyl resin was found to be ununiformly attached to/fused with the surfaces of the toner core particles. Since the toner core particles had high compatibility with [fine resin particle dispersion liquid 10], the protrusions became slightly large and also almost all portions of the protrusions embedded in the toner core particle to thereby decrease the coverage rate.

Comparative Example 14

[Toner 35] was obtained in the same manner as in Example 1, except that the [resin dispersion liquid 1] was changed to [resin dispersion liquid 11]. Through observation of [toner base 35], which had been obtained before the addition of the external additives, under a scanning electron microscope, the vinyl resin was found to be ununiformly attached to/fused with the surfaces of the toner core particles. Since the toner core particles had high compatibility with [fine resin particle dispersion liquid 11], the protrusions became slightly large and also almost all portions of the protrusions embedded in the toner core particle to thereby decrease the coverage rate.

The fine inorganic particles with which toner bases were mixed in Examples and Comparative Examples described above are summarized in the following table.

TABLE 1

| | External additives | Average primary particle diameter (nm) | Charge polarity |
| --- | --- | --- | --- |
| RX200 | (1) | 12 | − − − |
| RY200 | (2) | 12 | − − |
| RX50 | (3) | 40 | − − |
| RY50 | (4) | 40 | − − |
| MSP-009 | (5) | 80 | + + + |
| ACP-04 | (6) | 250 | + |
| ACP-06 | (7) | 100 | + |
| ACP-07 | (8) | 150 | + |
| P-2000 | (9) | 400 | + + |
| MP-300 | (10) | 60 | + |
| MP-400 | (11) | 200 | + |
| MP-5500 | (12) | 300 | + + |
| T110TSC | (13) | 100 | + |
| UFP-30 | (14) | 120 | − − |
| MSN-005 | (15) | 80 | − |
| MSP-005 | (16) | 16 | + + + |

In Table 1, the external additives whose charge polarities are "+," "++" and "+++" are those having the opposite polarity to that of each toner base, and the external additives whose charge polarities are "−," "−−" and "−−−" are those having the same polarity as that of each toner base.

Each of the above-obtained toners was evaluated by the below-described methods.

<Background Smear>

After printing of 2,000 sheets having a chart with an image area ratio of 1% using a color electrophotographic apparatus (IPSIO SP C220), a piece of Scotch tape was used to remove the toner attached on the photoconductor having been subjected to printing of white solid images, and the piece of tape was attached to blank paper. Then, the ΔE between blank paper to which a piece of Scotch tape was attached and blank paper to which a piece of Scotch tape was attached to remove the toner was measured with a spectrodensitometer (product of Pantone, Inc.) and evaluated on the basis of the following 4 ranks.

A: ΔE<3
B: 3≤ΔE<5
C: 5≤ΔE<10
D: 10≤ΔE

<Adhesion Resistance>

After printing of 1,000 sheets having a white solid image using a color electrophotographic apparatus (IPSIO SP C220), a black solid image was printed and evaluated for image quality on the basis of the following 4 ranks.

A: No white streaks were observed in the solid image; very good level
B: No white streaks were observed in the solid image but ununiformity in density was observed; non-problematic level in practical use
C: White streaks were observed in the solid image; problematic level in practical use
D: Noticeable white streaks were observed in the solid image; problematic level in practical use <Transfer Rate>

After printing of 2,000 sheets having a chart with an image area ratio of 1% using a color electrophotographic apparatus (IPSIO SP C220), the amount of the toner on the photoconductor and the amount of the toner of the black solid image (7.8 cm×1.0 cm) on the transfer belt were measured. The thus-measured amounts were used to calculate a transfer rate from the following equation:

Transfer rate=(the amount of the toner on the transfer belt/the amount of the toner on the photoconductor)×100

The obtained transfer rate was evaluated on the basis of the following 4 ranks.

A: 90% Transfer rate
B: 80% Transfer rate<90%
C: 70% Transfer rate<80%
D: Transfer rate<70%

<Transfer Unevenness>

After printing of 2,000 sheets having a chart with an image area ratio of 1% using a color electrophotographic apparatus (IPSIO SP C220), the black solid image (7.8 cm×1.0 cm) on the transfer belt was evaluated for transfer unevenness on the basis of the following 4 ranks by comparing with standard samples.

A: No transfer unevenness was observed, very good
B: Transfer unevenness was observed to such an extent that image quality was not adversely affected
C: Transfer unevenness was observed to such an extent that image quality was adversely affected
D: Noticeable transfer unevenness was observed, giving great adverse effects to image quality <Halftone Reproducibility>

After printing of 2,000 sheets having a chart with an image area ratio of 1% using a color electrophotographic apparatus (IPSIO SP C220), halftone image in which one dot image and one dot white image were alternately recorded repeatedly was printed on paper (TYPE 6000, product of Ricoh Company, Ltd.) and evaluated for halftone reproducibility on the basis of the following 4 ranks by comparing with standard samples.

A: Reproducibility was very good
B: Reproducibility was determined to such an extent that image quality was not adversely affected
C: Reproducibility was determined to such an extent that image quality was adversely affected
D: Reproducibility was determined to such an extent that gives great adverse effects to image quality <Change of Image Density>

Before and after printing of 2,000 sheets having a chart with an image area ratio of 1% using a color electrophotographic apparatus (IPSIO SP C220), a black solid image was printed on paper (TYPE 6000, product of Ricoh Company, Ltd.). Then, the image density was measured with a spectrodensitometer (product of X-Rite) and evaluated for the difference of image density between before and after printing of 2,000 sheets.

A: Difference<0.1%
B: 0.1%≤Difference<0.2%
C: 0.2%≤Difference<0.3%
D: 0.3%≤Difference <Cleanability>

After printing of 2,000 sheets having a chart with an image area ratio of 1% using a color electrophotographic apparatus (IPSIO SP C220), a white solid image was printed out and evaluated for the presence or absence of cleaning failures on the basis of the following 4 ranks.

A: No cleaning failure was observed, very good
B: Cleaning failure was observed but non-problematic in practical use
C: Cleaning failure was observed and problematic in practical use
D: Noticeable cleaning failure was observed <Charging Roller Smear>

After printing of 2,000 sheets having a chart with an image area ratio of 1% using a color electrophotographic apparatus (IPSIO SP C220), a surface of the charging roller was visually evaluated for smear on the basis of the following 4 ranks.

A: No roller smear was observed, very good
B: Roller smear was observed but non-problematic in practical use
C: Roller smear was observed and problematic in practical use
D: Noticeable roller smear was observed <Photoconductor Abrasion>

After printing of 2,000 sheets having a chart with an image area ratio of 1% using a color electrophotographic apparatus (IPSIO SP C220), a surface of the charging roller was visually evaluated for abrasion on the basis of the following 4 ranks.

A: No streaky abrasion was observed, very good
B: Streaky abrasion was observed but non-problematic in practical use
C: Streaky abrasion was observed and problematic in practical use
D: Noticeable streaky abrasion was observed <Fish-Shaped Mark of Photoconductor>

After printing of 2,000 sheets having a chart with an image area ratio of 1% using a color electrophotographic apparatus (IPSIO SP C220), a surface of the presence of fish-shaped mark was evaluated visually and with the black solid image on the basis of the following 4 ranks.

A: No fish-shaped mark was observed, very good

B: Fish-shaped mark was observed but non-problematic in practical use

C: Fish-shaped mark was observed and problematic in practical use

D: Noticeable fish-shaped mark was observed

The physical properties and evaluation results of toners according to Examples and Comparative Examples above are summarized in Tables 2-1, 2-2, and 3-1 to 3-4.

TABLE 2-1

| | Toner base | | | |
|---|---|---|---|---|
| | Average particle diameter (μm) | Sphericity | Protrusions | | |
| | | | Long side length (μm) | Standard deviation | Coverage rate (%) |
| Ex. 1 | 6.5 | 0.985 | 0.23 | 0.10 | 56 |
| Ex. 2 | 6.5 | 0.985 | 0.23 | 0.10 | 56 |
| Ex. 3 | 6.5 | 0.985 | 0.23 | 0.10 | 56 |
| Ex. 4 | 6.5 | 0.985 | 0.23 | 0.10 | 56 |
| Ex. 5 | 6.5 | 0.985 | 0.23 | 0.10 | 56 |
| Ex. 6 | 6.5 | 0.985 | 0.23 | 0.10 | 56 |
| Ex. 7 | 6.5 | 0.985 | 0.23 | 0.10 | 56 |
| Ex. 8 | 6.5 | 0.985 | 0.23 | 0.10 | 56 |
| Ex. 9 | 6.5 | 0.985 | 0.23 | 0.10 | 56 |
| Ex. 10 | 6.5 | 0.985 | 0.23 | 0.10 | 56 |
| Ex. 11 | 6.5 | 0.985 | 0.23 | 0.10 | 56 |
| Ex. 12 | 6.5 | 0.985 | 0.23 | 0.10 | 56 |
| Ex. 13 | 6.5 | 0.985 | 0.23 | 0.10 | 56 |
| Ex. 14 | 6.6 | 0.985 | 0.26 | 0.11 | 51 |
| Ex. 15 | 6.8 | 0.986 | 0.27 | 0.12 | 54 |
| Ex. 16 | 6.7 | 0.980 | 0.39 | 0.10 | 53 |
| Ex. 17 | 7.6 | 0.980 | 0.22 | 0.09 | 49 |
| Ex. 18 | 8.6 | 0.976 | 0.29 | 0.12 | 52 |
| Ex. 19 | 6.7 | 0.980 | 0.25 | 0.10 | 32 |
| Ex. 20 | 6.6 | 0.985 | 0.23 | 0.09 | 81 |
| Ex. 21 | 8.1 | 0.986 | 0.34 | 0.12 | 36 |

TABLE 2-2

| | Toner base | | | | |
|---|---|---|---|---|---|
| | Average particle diameter (μm) | Sphericity | Protrusions | | |
| | | | Long side length (μm) | Standard deviation | Coverage rate (%) |
| Com. Ex. 1 | 5.7 | 0.986 | — | — | — |
| Com. Ex. 2 | 8.1 | 0.980 | — | — | — |
| Com. Ex. 3 | 6.5 | 0.985 | 0.23 | 0.10 | 56 |
| Com. Ex. 4 | 6.5 | 0.985 | 0.23 | 0.10 | 56 |
| Com. Ex. 5 | 6.5 | 0.985 | 0.23 | 0.10 | 56 |
| Com. Ex. 6 | 6.5 | 0.985 | 0.23 | 0.10 | 56 |
| Com. Ex. 7 | 6.5 | 0.985 | 0.23 | 0.10 | 56 |
| Com. Ex. 8 | 6.5 | 0.985 | 0.23 | 0.10 | 56 |
| Com. Ex. 9 | 4.9 | 0.931 | 0.40 | 0.22 | 98 |
| Com. Ex. 10 | 5.5 | 0.982 | 0.19 | 0.06 | 54 |
| Com. Ex. 11 | 6.7 | 0.978 | 0.72 | 0.49 | 58 |
| Com. Ex. 12 | 6.7 | 0.986 | 0.52 | 0.22 | 67 |
| Com. Ex. 13 | 6.9 | 0.987 | 0.23 | 0.11 | 28 |
| Com. Ex. 14 | 6.9 | 0.985 | 0.15 | 0.10 | 12 |

TABLE 3-1

| | Background smear | Adhesion resistance | Transfer rate | Transfer unevenness | Halftone reproducibility |
|---|---|---|---|---|---|
| Ex. 1 | A | A | A | A | A |
| Ex. 2 | B | A | A | A | A |
| Ex. 3 | A | A | A | A | A |
| Ex. 4 | B | B | A | A | A |
| Ex. 5 | B | B | A | A | A |
| Ex. 6 | B | B | A | A | A |
| Ex. 7 | A | A | A | B | B |
| Ex. 8 | A | B | A | A | A |
| Ex. 9 | A | B | A | A | A |
| Ex. 10 | A | A | A | A | A |
| Ex. 11 | B | A | A | A | A |
| Ex. 12 | A | A | A | A | A |
| Ex. 13 | A | A | A | A | A |
| Ex. 14 | B | A | A | A | A |
| Ex. 15 | B | B | A | B | B |
| Ex. 16 | A | A | A | A | A |
| Ex. 17 | B | B | A | A | A |
| Ex. 18 | A | A | A | A | A |
| Ex. 19 | A | A | A | A | A |
| Ex. 20 | A | A | A | A | A |
| Ex. 21 | A | A | A | A | A |

TABLE 3-2

| | Background smear | Adhesion resistance | Transfer rate | Transfer unevenness | Halftone reproducibility |
|---|---|---|---|---|---|
| Com. Ex. 1 | D | B | D | D | D |
| Com. Ex. 2 | D | B | D | D | C |
| Com. Ex. 3 | B | D | B | B | C |
| Com. Ex. 4 | A | D | B | C | C |
| Com. Ex. 5 | D | D | D | D | D |
| Com. Ex. 6 | D | D | D | D | D |
| Com. Ex. 7 | D | D | D | D | D |
| Com. Ex. 8 | D | C | D | D | D |
| Com. Ex. 9 | B | D | A | A | C |
| Com. Ex. 10 | D | D | D | D | D |
| Com. Ex. 11 | D | D | D | D | D |
| Com. Ex. 12 | D | D | D | D | D |
| Com. Ex. 13 | C | B | B | B | C |
| Com. Ex. 14 | D | B | B | C | C |

TABLE 3-3

| | Change of image density | Cleanability | Charging roller smear | Photoconductor membrane abrasion | Photoconductor Fish-shaped mark |
|---|---|---|---|---|---|
| Ex. 1 | A | A | A | A | A |
| Ex. 2 | A | A | A | B | A |
| Ex. 3 | A | B | A | A | A |
| Ex. 4 | A | A | B | A | A |
| Ex. 5 | A | A | B | A | A |
| Ex. 6 | A | A | B | A | A |
| Ex. 7 | A | A | B | B | B |
| Ex. 8 | A | B | A | A | A |
| Ex. 9 | A | A | A | A | A |
| Ex. 10 | A | A | B | A | A |
| Ex. 11 | A | A | B | A | A |
| Ex. 12 | A | A | A | A | A |
| Ex. 13 | A | A | A | A | A |
| Ex. 14 | A | A | A | A | A |
| Ex. 15 | A | A | A | A | A |
| Ex. 16 | A | A | A | A | A |
| Ex. 17 | A | B | A | A | A |
| Ex. 18 | A | A | A | A | A |
| Ex. 19 | A | A | A | A | A |
| Ex. 20 | A | A | A | A | A |
| Ex. 21 | A | A | A | A | A |

TABLE 3-4

|  | Change of Image density | Clean- ability | Charging roller smear | Photocon- ductor membrane abrasion | Photocon- ductor Fish-shaped mark |
|---|---|---|---|---|---|
| Com. Ex. 1 | C | D | C | A | C |
| Com. Ex. 2 | C | D | C | A | C |
| Com. Ex. 3 | C | B | B | B | D |
| Com. Ex. 4 | C | C | B | B | C |
| Com. Ex. 5 | C | D | A | C | B |
| Com. Ex. 6 | C | D | A | C | B |
| Com. Ex. 7 | D | B | C | B | B |
| Com. Ex. 8 | C | C | A | C | B |
| Com. Ex. 9 | C | C | A | B | B |
| Com. Ex. 10 | D | B | D | C | D |
| Com. Ex. 11 | D | B | D | C | D |
| Com. Ex. 12 | D | B | D | C | D |
| Com. Ex. 13 | C | B | B | B | B |
| Com. Ex. 14 | C | D | C | C | C |

As is clear from the above results, the present invention can provide remarkably advantageous effects by providing a toner and an electrophotographic developing device which do not contaminate a charging device, a developing device, a photoconductor and an intermediate transfer member, which can form a high-quality image having a proper image density with much less background smear even after long-term repetitive printing, and which can stably form an image with high reproducibility on any recording medium without involving blur or spot due to scattering.

The embodiments of the present invention are as follows.

<1> An electrostatic image developing toner including:
toner particles each including a binder resin and a colorant; and
an external additive carried on the toner particles,
wherein the toner particles each have protrusions on a surface thereof,
wherein an average of lengths of long sides of the protrusions is 0.10 μm or more but less than 0.50 μm, a standard deviation of the lengths of the long sides of the protrusions is 0.20 or less, and a coverage rate of the protrusions on the surface of each toner particle is 30% to 90%,
wherein the external additive includes at least two different fine particles comprising external additive (A) and one or more external additives (B), and
wherein the external additive (A) has a longest average primary particle diameter among the external additives and is charged to have the opposite polarity to that of the toner particles, and at least one of the one or more external additives (B) is charged to have the same polarity as that of the toner particles.

<2> The electrostatic image developing toner according to <1>, wherein the external additive (A) has an average primary particle diameter of 50 nm to 500 nm.

<3> The electrostatic image developing toner according to <1> or <2>, wherein the one or more external additives (B) each have an average primary particle diameter of 10 nm to 50 nm.

<4> The electrostatic image developing toner according to any one of <1> to <3>, wherein an amount of the external additive (A) is 0.1% by mass to 2.0% by mass relative to the toner particles.

<5> The electrostatic image developing toner according to any one of <1> to <4>, wherein an amount of the one or more external additives (B) is 0.1% by mass to 5.0% by mass relative to the toner particles.

<6> The electrostatic image developing toner according to any one of <1> to <5>, wherein a material of which the protrusions are formed is a resin which is different from the binder resin.

<7> The electrostatic image developing toner according to <6>, wherein the material of which the protrusions are formed is a resin containing styrene.

<8> The electrostatic image developing toner according to any one of <1> to <7>, wherein the toner particles are obtained through a process including producing toner core particles, and attaching or fusing the protrusions on surfaces of the toner core particles.

<9> The electrostatic image developing toner according to any one of <1> to <8>, wherein the toner particles are obtained by forming the protrusions on toner core particles, and the toner core particles are obtained through granulation performed by emulsifying or dispersing, in an aqueous medium, an oil phase containing at least the colorant and a first resin as the binder resin, a precursor of the first resin as a precursor of the binder resin, or both of the first resin and the precursor.

<10> The electrostatic image developing toner according to any one of <1> to <9>, wherein the toner particles are obtained by adding an aqueous dispersion liquid of fine resin particles to an aqueous medium containing toner core particles emulsified or dispersed therein, to attach or fuse the fine resin particles to surfaces of the core particles.

<11> A toner container including:
the electrostatic image developing toner according to any one of <1> to <10>, and
a container, which houses the electrostatic image developing toner.

<12> A developer including:
the electrostatic image developing toner according to any one of <1> to <10>.

<13> An image forming apparatus including:
a latent image bearing member which bears a latent image thereon,
a charging unit configured to uniformly charge a surface of the latent image bearing member,
an exposing unit configured to expose the charged surface of the latent image bearing member to light based on image data to form a latent electrostatic image,
a toner with which the latent image is visualized,
a developing unit configured to supply the toner to the latent electrostatic image formed on the surface of the latent image bearing member and develop the latent electrostatic image, to thereby form a visible image on the surface of the latent image bearing member,
a transfer unit configured to transfer, onto an image-receiving medium, the visible image on the surface of the latent image bearing member, and
a fixing unit configured to fix the visible image on the image-receiving medium,
wherein the toner is the electrostatic image developing toner according to any one of <1> to <10>.

<14> An image forming method including:
uniformly charging a surface of a latent image bearing member;
exposing the charged surface of the latent image bearing member to light based on image data to form a latent electrostatic image,
developing, with a toner, the latent electrostatic image formed on the surface of the latent image bearing member to form a visible image on the surface of the latent image bearing member,
transferring, onto an image-receiving medium, the visible image on the surface of the latent image bearing member, and
fixing the visible image on the image-receiving medium,
wherein the toner is the electrostatic image developing toner according to any one of <1> to <10>.

<15> A process cartridge including:
a latent image bearing member,
a developing unit configured to supply a toner to a latent electrostatic image formed on a surface of the latent image bearing member to develop the latent electrostatic image, to thereby form a visible image on the surface of the latent image bearing member,
the latent image bearing member and the developing unit being integrally supported in the process cartridge which is mounted detachably to an image forming apparatus,
wherein the toner is the electrostatic image developing toner according to any one of <1> to <10>.

This application claims priority to Japanese application No. 2011-058740, filed on Mar. 17, 2011, and incorporated herein by reference.

What is claimed is:

1. An electrostatic image developing toner comprising:
    toner particles each comprising a binder resin and a colorant; and
    an external additive carried on the toner particles,
    wherein the toner particles each have protrusions on a surface thereof,
    wherein an average of lengths of long sides of the protrusions is 0.10 µm or more but less than 0.50 µm, a standard deviation of the lengths of the long sides of the protrusions is 0.20 or less, and a coverage rate of the protrusions on the surface of each toner particle is 30% to 90%,
    wherein the external additive comprises at least two different fine particles comprising external additive (A) and one or more external additives (B), and
    wherein the external additive (A) has a longest average primary particle diameter among the external additives and is charged to have the opposite polarity to that of the toner particles, and at least one of the one or more external additives (B) is charged to have the same polarity as that of the toner particles.

2. The electrostatic image developing toner according to claim 1, wherein the external additive (A) has an average primary particle diameter of 50 nm to 500 nm.

3. The electrostatic image developing toner according to claim 1, wherein the one or more external additives (B) each have an average primary particle diameter of 10 nm to 50 nm.

4. The electrostatic image developing toner according to claim 1, wherein an amount of the external additive (A) is 0.1% by mass to 2.0% by mass relative to the toner particles.

5. The electrostatic image developing toner according to claim 1, wherein an amount of the one or more external additives (B) is 0.1% by mass to 5.0% by mass relative to the toner particles.

6. The electrostatic image developing toner according to claim 1, wherein a material of which the protrusions are formed is a resin which is different from the binder resin.

7. The electrostatic image developing toner according to claim 6, wherein the material of which the protrusions are formed is a resin containing styrene.

8. The electrostatic image developing toner according to claim 1, wherein the toner particles are obtained through a process including producing toner core particles, and attaching or fusing the protrusions on surfaces of the toner core particles.

9. The electrostatic image developing toner according to claim 1, wherein the toner particles are obtained by forming the protrusions on toner core particles, and the toner core particles are obtained through granulation performed by emulsifying or dispersing, in an aqueous medium, an oil phase containing at least the colorant and a first resin as the binder resin, a precursor of the first resin as a precursor of the binder resin, or both of the first resin and the precursor.

10. The electrostatic image developing toner according to claim 1, wherein the toner particles are obtained by adding an aqueous dispersion liquid of fine resin particles to an aqueous medium containing toner core particles emulsified or dispersed therein, to attach or fuse the fine resin particles to surfaces of the core particles.

11. A developer comprising:
    an electrostatic image developing toner which comprises:
    toner particles each comprising a binder resin and a colorant; and
    an external additive carried on the toner particles,
    wherein the toner particles each have protrusions on a surface thereof,
    wherein an average of lengths of long sides of the protrusions is 0.10 µm or more but less than 0.50 µm standard deviation of the lengths of the long sides of the protrusions is 0.20 or less, and a coverage rate of the protrusions on the surface of each toner particle is 30% to 90%,
    wherein the external additive comprises at least two different fine particles comprising external additive (A) and one or more external additives (B), and
    wherein the external additive (A) has a longest average primary particle diameter among the external additives and is charged to have the opposite polarity to that of the toner particles, and at least one of the one or more external additives (B) is charged to have the same polarity as that of the toner particles.

12. The developer according to claim 11, wherein the external additive (A) has an average primary particle diameter of 50 nm to 500 nm.

13. The developer according to claim 11, wherein the one or more external additives (B) each have an average primary particle diameter of 10 nm to 50 nm.

14. The developer according to claim 11, wherein an amount of the external additive (A) is 0.1% by mass to 2.0% by mass relative to the toner particles.

15. The developer according to claim 11, wherein an amount of the one or more external additives (B) is 0.1% by mass to 5.0% by mass relative to the toner particles.

16. An image forming apparatus comprising:
    a latent image bearing member which bears a latent image thereon,
    a charging unit configured to uniformly charge a surface of the latent image bearing member,
    an exposing unit configured to expose the charged surface of the latent image bearing member to light based on image data to form a latent electrostatic image,
    a toner with which the latent image is visualized,
    a developing unit configured to supply the toner to the latent electrostatic image formed on the surface of the latent image bearing member to develop the latent electrostatic image, to thereby form a visible image on the surface of the latent image bearing member,
    a transfer unit configured to transfer, onto an image-receiving medium, the visible image on the surface of the latent image bearing member, and
    a fixing unit configured to fix the visible image on the image-receiving medium,
    wherein the toner comprises:
    toner particles each comprising a binder resin and a colorant; and
    an external additive carried on the toner particles,
    wherein the toner particles each have protrusions on a surface thereof, wherein an average of lengths of long sides of the protrusions is 0.10 μm or more but less than 0.50 μm, a standard deviation of the lengths of the long sides of the protrusions is 0.20 or less, and a coverage rate of the protrusions on the surface of each toner particle is 30% to 90%, wherein the external additive comprises at least two different fine particles comprising external additive (A) and one or more external additives (B), and wherein the external additive (A) has a longest average primary particle diameter among the external additives and is charged to have the opposite polarity to that of the toner particles, and at least one of the one or more external additives (B) is charged to have the same polarity as that of the toner particles.

17. The image forming apparatus according to claim 16, wherein the external additive (A) has an average primary particle diameter of 50 nm to 500 nm.

18. The image forming apparatus according to claim 16, wherein the one or more external additives (B) each have an average primary particle diameter of 10 nm to 50 nm.

19. The image forming apparatus according to claim 16, wherein an amount of the external additive (A) is 0.1% by mass to 2.0% by mass relative to the toner particles.

20. The image forming apparatus according to claim 16, wherein an amount of the one or more external additives (B) is 0.1% by mass to 5.0% by mass relative to the toner particles.

* * * * *